(12) United States Patent
Khoshnevisan et al.

(10) Patent No.: US 12,034,501 B1
(45) Date of Patent: Jul. 9, 2024

(54) RATE SPLITTING FOR MULTIPLE INPUT MULTIPLE OUTPUT COMMUNICATIONS

(71) Applicant: QUALCOMM Incorporated, San Diego, CA (US)

(72) Inventors: Mostafa Khoshnevisan, San Diego, CA (US); Ahmed Abdelaziz Ibrahim Abdelaziz Zewail, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/066,717

(22) Filed: Dec. 15, 2022

(51) Int. Cl.
*H04B 7/0413* (2017.01)
*H04B 1/10* (2006.01)
*H04W 8/24* (2009.01)

(52) U.S. Cl.
CPC ......... *H04B 7/0413* (2013.01); *H04B 1/1081* (2013.01); *H04W 8/24* (2013.01)

(58) Field of Classification Search
CPC ...... H04B 7/0413; H04B 1/1081; H04W 8/24
See application file for complete search history.

(56) References Cited

U.S. PATENT DOCUMENTS

2022/0302966 A1* 9/2022 Sun .................. H04L 5/0048

* cited by examiner

*Primary Examiner* — Rahel Guarino
(74) *Attorney, Agent, or Firm* — Guang Yu Zhang; Harrity & Harrity, LLP

(57) ABSTRACT

Various aspects of the present disclosure generally relate to wireless communication. In some aspects, a user equipment (UE) may transmit capability information indicating a capability of the UE to support a rate splitting multiple input multiple output (MIMO) communication. The UE may receive, based at least in part on the capability information, configuration information associated with the rate splitting MIMO communication. The UE may identify, based at least in part on the configuration information, at least one of a downlink control information (DCI) format, a DCI size, one or more DCI fields, or one or more DCI field sizes associated with a DCI communication associated with the rate splitting MIMO communication. The UE may monitor the DCI communication and decoding the rate splitting MIMO communication based at least in part on the configuration information and the DCI communication. Numerous other aspects are described.

30 Claims, 11 Drawing Sheets

RATE SPLITTING FOR MULTIPLE INPUT
MULTIPLE OUTPUT COMMUNICATIONS

FIELD OF THE DISCLOSURE

Aspects of the present disclosure generally relate to wireless communication and to techniques and apparatuses for rate splitting for multiple input multiple output communications.

BACKGROUND

Wireless communication systems are widely deployed to provide various telecommunication services such as telephony, video, data, messaging, and broadcasts.

Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting capability information indicating a capability of the UE to support a rate splitting multiple input multiple output (MIMO) communication. The method may include receiving, based at least in part on the capability information, configuration information associated with the rate splitting MIMO communication. The method may include identifying, based at least in part on the configuration information, at least one of a downlink control information (DCI) format, a DCI size, one or more DCI fields, or one or more DCI field sizes associated with a DCI communication associated with the rate splitting MIMO communication. The method may include monitoring the DCI communication and decoding the rate splitting MIMO communication based at least in part on the configuration information and the DCI communication.

Some aspects described herein relate to a method of wireless communication performed by a network node. The method may include receiving capability information indicating a capability of a UE to support a rate splitting MIMO communication. The method may include transmitting, based at least in part on the capability information, configuration information associated with the rate splitting MIMO communication. The method may include transmitting, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information.

Some aspects described herein relate to a UE for wireless communication. The user equipment may include a memory and one or more processors coupled to the memory. The one or more processors may be configured to transmit capability information indicating a capability of the UE to support a rate splitting MIMO communication. The one or more processors may be configured to receive, based at least in part on the capability information, configuration information associated with the rate splitting MIMO communication. The one or more processors may be configured to identify, based at least in part on the configuration information, at least one of a DCI format, a DCI size, one or more DCI fields, or one or more DCI field sizes associated with a DCI communication associated with the rate splitting MIMO communication. The one or more processors may be configured to monitor the DCI communication and decoding the rate splitting MIMO communication based at least in part on the configuration information and the DCI communication.

Some aspects described herein relate to a network node for wireless communication. The network node may include a memory and one or more processors coupled to the memory. The one or more processors may be configured to receive capability information indicating a capability of a UE to support a rate splitting MIMO communication. The one or more processors may be configured to transmit, based at least in part on the capability information, configuration information associated with the rate splitting MIMO communication. The one or more processors may be configured to transmit, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information.

Some aspects described herein relate to a non-transitory computer-readable medium that stores a set of instructions for wireless communication by a UE. The set of instructions, when executed by one or more processors of the UE, may cause the UE to transmit capability information indicating a capability of the UE to support a rate splitting MIMO communication. The set of instructions, when executed by one or more processors of the UE, may cause the UE to receive, based at least in part on the capability information, configuration information associated with the rate splitting MIMO communication. The set of instructions, when executed by one or more processors of the UE, may cause the UE to identify, based at least in part on the configuration information, at least one of a DCI format, a DCI size, one or more DCI fields, or one or more DCI field sizes associated with a DCI communication associated with the rate splitting MIMO communication. The set of instructions, when executed by one or more processors of the UE, may cause the UE to monitor the DCI communication and decoding the rate splitting MIMO communication based at least in part on the configuration information and the DCI communication.

Some aspects described herein relate to a non-transitory computer-readable medium that stores a set of instructions for wireless communication by a network node. The set of instructions, when executed by one or more processors of the network node, may cause the network node to receive capability information indicating a capability of a UE to support a rate splitting MIMO communication. The set of instructions, when executed by one or more processors of the network node, may cause the network node to transmit, based at least in part on the capability information, configuration information associated with the rate splitting MIMO communication. The set of instructions, when executed by one or more processors of the network node, may cause the network node to transmit, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information.

Some aspects described herein relate to an apparatus for wireless communication. The apparatus may include means for transmitting capability information indicating a capability of the apparatus to support a rate splitting MIMO communication. The apparatus may include means for receiving, based at least in part on the capability information, configuration information associated with the rate splitting MIMO communication. The apparatus may include means for identifying, based at least in part on the configuration information, at least one of a DCI format, a DCI size, one or more DCI fields, or one or more DCI field sizes associated with a DCI communication associated with the rate splitting MIMO communication. The apparatus may include means for monitoring the DCI communication and decoding the rate splitting MIMO communication based at least in part on the configuration information and the DCI communication.

Some aspects described herein relate to an apparatus for wireless communication. The apparatus may include means for receiving capability information indicating a capability of a UE to support a rate splitting MIMO communication. The apparatus may include means for transmitting, based at least in part on the capability information, configuration information associated with the rate splitting MIMO communication. The apparatus may include means for transmitting, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
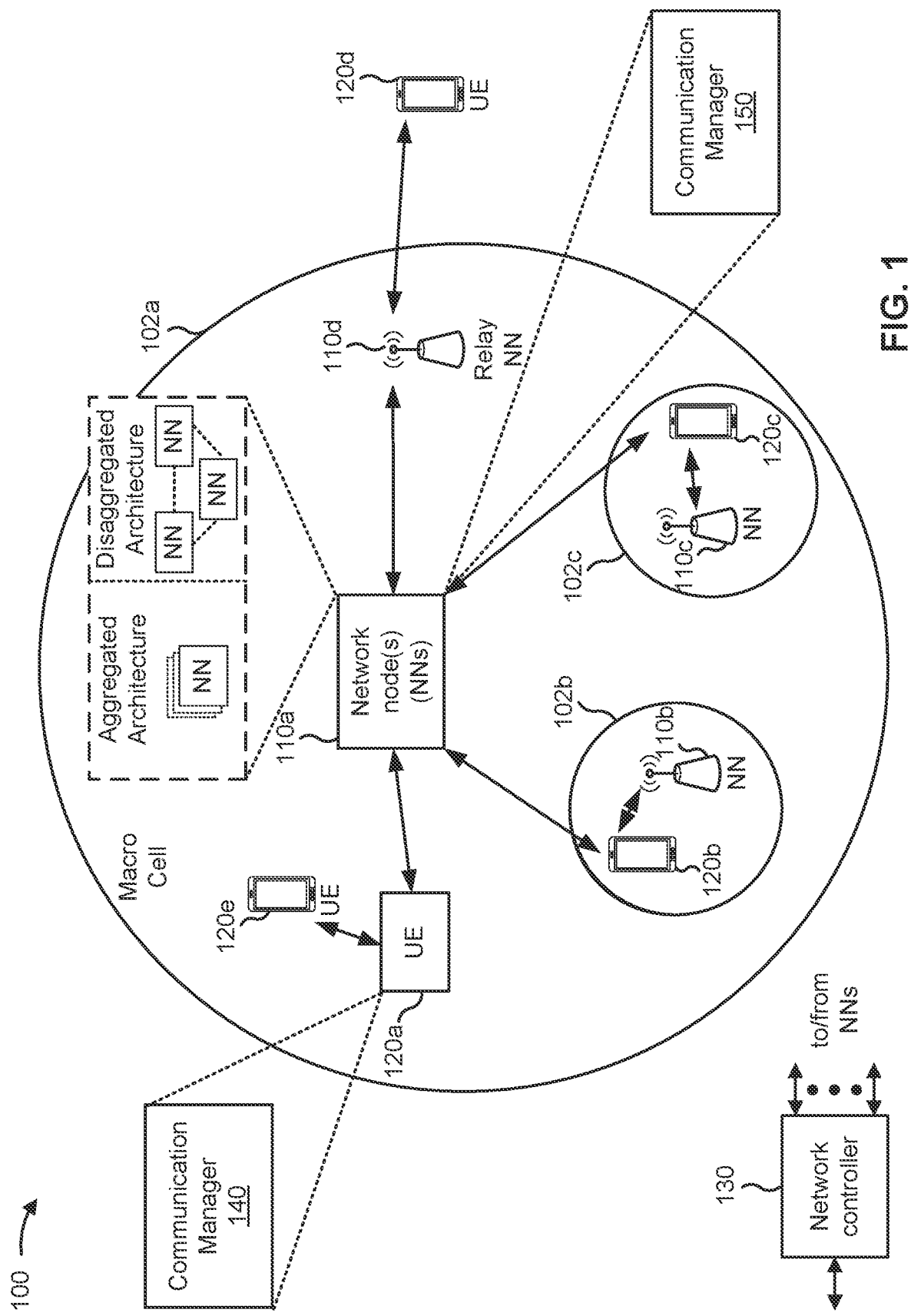
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit capability information indicating a capability of the UE to support a rate splitting multiple input multiple output (MIMO) communication; receive, based at least in part on the capability information, configuration information associated with the rate splitting MIMO communication; identify, based at least in part on the configuration information, at least one of a downlink control information (DCI) format, a DCI size, one or more DCI fields, or one or more DCI field sizes associated with a DCI communication associated with the rate splitting MIMO communication; and monitor the DCI communication and decoding the rate splitting MIMO communication based at least in part on the configuration information and the DCI communication. Additionally, or alternatively, the communication manager 140 may perform one or more other operations described herein.

In some aspects, the network node 110 may include a communication manager 150. As described in more detail elsewhere herein, the communication manager 150 may receive capability information indicating a capability of a UE to support a rate splitting MIMO communication; transmit, based at least in part on the capability information, configuration information associated with the rate splitting MIMO communication; and transmit, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information. Additionally, or alternatively, the communication manager 150 may perform one or more other operations described herein.

As indicated above, FIG. 1 is provided as an example. Other examples may differ from what is described with regard to FIG. 1.

Figure 2:
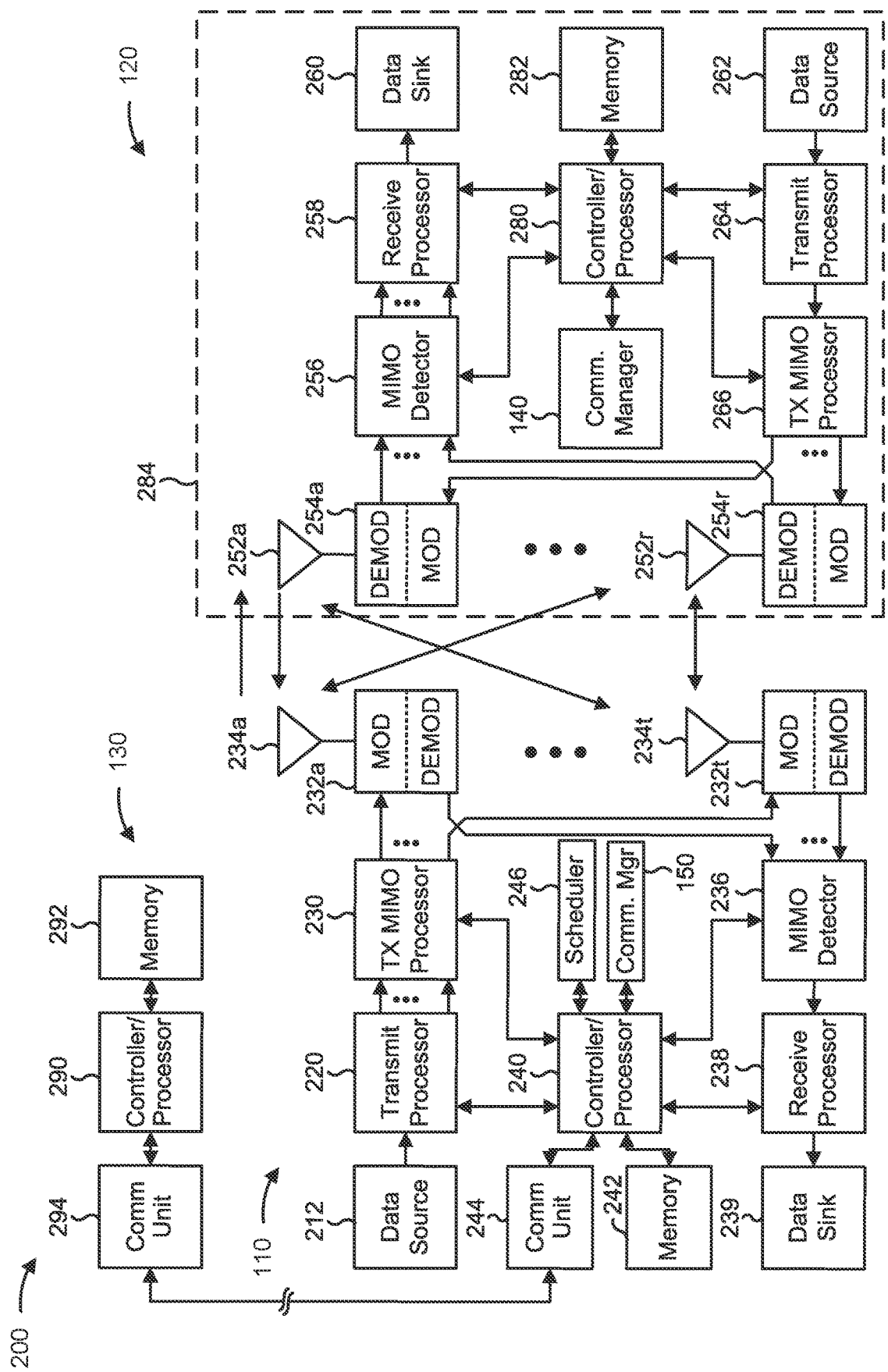
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) MIMO processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232.

Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the network node 110, the controller/processor 280 of the UE 120, and/or any other component(s) of FIG. 2 may perform one or more techniques associated with rate splitting for MIMO communications, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for transmitting capability information indicating a capability of the UE to support a rate splitting MIMO communication; means for receiving, based at least in part on the capability information, configuration information associated with the rate splitting MIMO communication; means for identifying, based at least in part on the configuration information, at least one of a DCI format, a DCI size, one or more DCI fields, or one or more DCI field sizes associated with a DCI communication associated with the rate splitting MIMO communication; and/or means for monitoring the DCI communication and decoding the rate splitting MIMO communication based at least in part on the configuration information and the DCI communication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving capability information indicating a capability of a UE to support a rate splitting MIMO communication; means for transmitting, based at least in part on the capability information, configuration information associated with the rate splitting MIMO communication; and/or means for transmitting, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
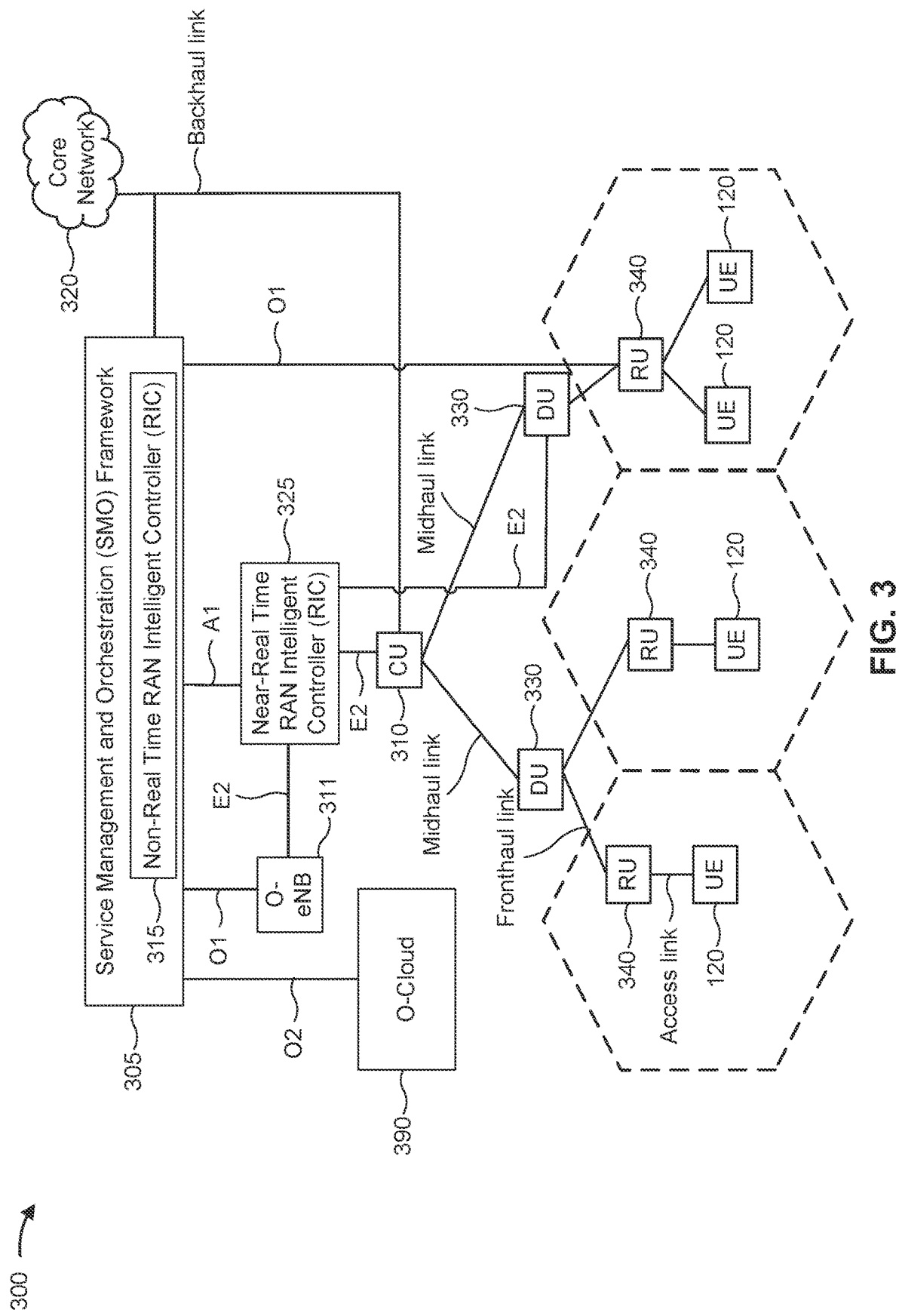
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through RRC1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
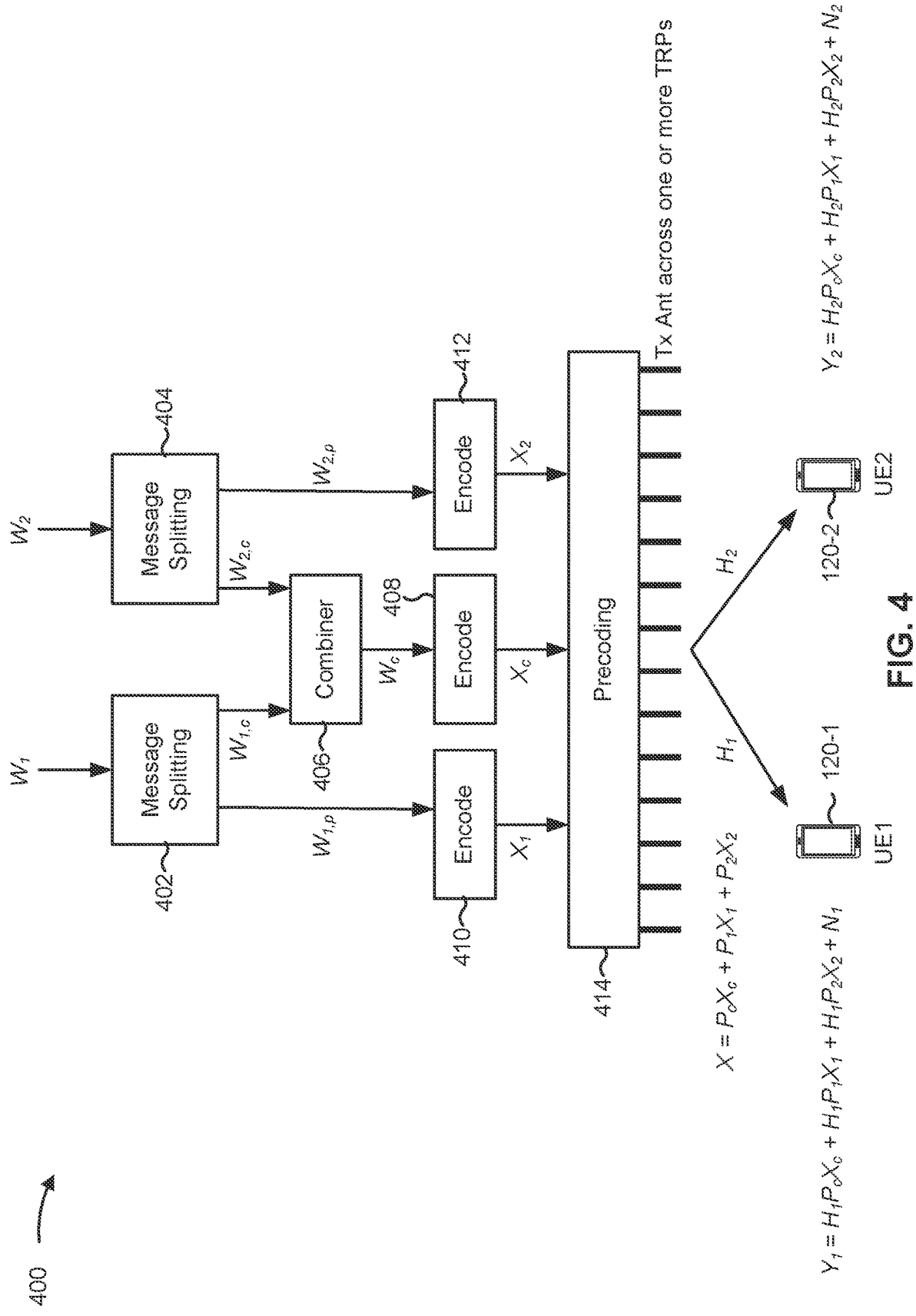
FIG. 4 is a diagram illustrating an example of a rate splitting multiple input multiple output (MIMO) communication, in accordance with the present disclosure.

FIG. 4 is a diagram illustrating an example 400 of a rate splitting MIMO communication, in accordance with the present disclosure.

Rate splitting MIMO may refer to a communication scheme that splits user messages into common and private parts, and that encodes the common parts into one or several communication streams while encoding the private parts into separate streams. Receivers (e.g., UEs 120) may then decode the common stream, perform successive interference cancellation (SIC) based at least in part on decoding the common stream, and/or decode their respective private streams. Each receiver may then reconstruct its original message from the part of its message embedded in the common stream and its private stream. In some cases, rate splitting MIMO may result in decoding part of interference at a receiver (e.g., the part of the interference included in the common stream) and treating part of interference as noise (e.g., the part of the interference included in private streams not intended for the receiver), resulting in improved network performance (e.g., reduced latency, increased throughput, and/or reduced power, computing, and/or communication resource consumption) as compared to other communications schemes (e.g., schemes which may fully treat multi-user interference as noise, leading to increased communication errors, and/or schemes which may fully decode multi-user interference, resulting in high power, computing, and communication resource consumption).

Example 400 illustrates a rate splitting MIMO scheme for two UEs 120, shown as UE1 120-1 and UE2 120-2 in FIG. 4. In example 400, a first message $W_1$ is intended for UE1 120-1, and a second message $W_2$ is intended for UE2 120-2. As shown by reference numbers 402 and 404, the first message $W_1$ and the second message $W_2$ may be split into common and private parts. More particularly, as shown in connection with the message splitting block indicated by reference number 402, the first message $W_1$ may be split into a common part $W_{1,c}$ and a private part $W_{1,p}$, and, as shown in connection with the message splitting block indicated by reference number 404, the second message $W_2$ may be split into a common part $W_{2,c}$ and a private part $W_{2,p}$. As shown in connection with the combiner block indicated by reference number 406, the common parts $W_{1,c}$ and $W_{2,c}$ may be combined (e.g., concatenated) into a common message $W_c$, and, as shown in connection with the encoder block indicated by reference number 408, the common message $W_c$ may be encoded and modulated to a common stream $X_c$, which may have one or more layers. Put another way, the common part of individual messages (in this case the common part $W_{1,c}$ of the first message $W_1$ and the common part $W_{2,c}$ of the first message $W_2$) of two or more UEs 120 (e.g., UE1 120-1 and UE2 120-2) may be concatenated into a common message (e.g., $W_c$), and encoded and modulated to a common stream (e.g., $X_c$) including one or more layers. As shown in connection with the encode blocks indicated by reference numbers 410 and 412, the private parts $W_{1,p}$ and $W_{2,p}$ of the individual messages $W_1$ and $W_2$ may be separately encoded and modulated into a first private stream $X_1$ and a second private stream $X_2$. In some cases, operations performed at the encode blocks indicated by reference numbers 408, 410, and 412 may include modulation and mapping to one or more layers (including codeword (CW)-layer mapping) in addition to encoding.

As shown by reference number 414, the various streams (e.g., the common stream $X_c$, the first private stream $X_1$, and the second private stream $X_2$) may be precoded and transmitted by transmission (Tx) antennas from one or more network nodes 110s and/or TRPs (e.g., from one network node 110 or else from multiple network nodes 110 and/or TRPs in a coordinated multipoint (CoMP) transmission scenario or similar transmission scenario). More particularly, the common stream $X_c$ may be precoded by $P_c$, the first private stream $X_1$ may be precoded by $P_1$, and the second private stream $X_2$ may be precoded by $P_2$, such that the transmit stream X transmitted by the Tx antennas may be equal to $P_cX_c+P_1X_1+P_2X_2$. More generally, for K receivers (e.g., for K UEs 120), the transmit stream X may be expressed as $P_cX_c+\Sigma_{k \in K}P_kX_k$, with $X_k$ corresponding to the encoded message intended for each receiver k. The transmit stream X may be transmitted to each receiver (e.g., UE1 120-1 and UE2 120-2 in the depicted example) over respective channels $H_1$ and $H_2$, such as via a corresponding physical downlink shared channel (PDSCH) associated with the respective channels $H_1$ and $H_2$. Accordingly, the signal received by the UE1 120-1, denoted as $Y_1$, may be expressed as $H_1P_cX_c+H_1P_1X_1+H_1P_2X_2+N_1$, where $N_1$ corresponds to noise in the channel. Similarly, the signal received by the UE2 120-2, denoted as $Y_2$, may be expressed as $H_2P_cX_c+H_2P_1XJ+H_2P_2X_2+N_2$, where $N_2$ corresponds to noise in the channel. The individual receivers (e.g., UE1 120-1 and UE2 120-2) may then decode the common and private parts of the received signals (e.g., $Y_1$ and $Y_2$), which is described in more detail in connection with FIG. 5.

As indicated above, FIG. 4 is provided as an example. Other examples may differ from what is described with respect to FIG. 4.

Figure 5:
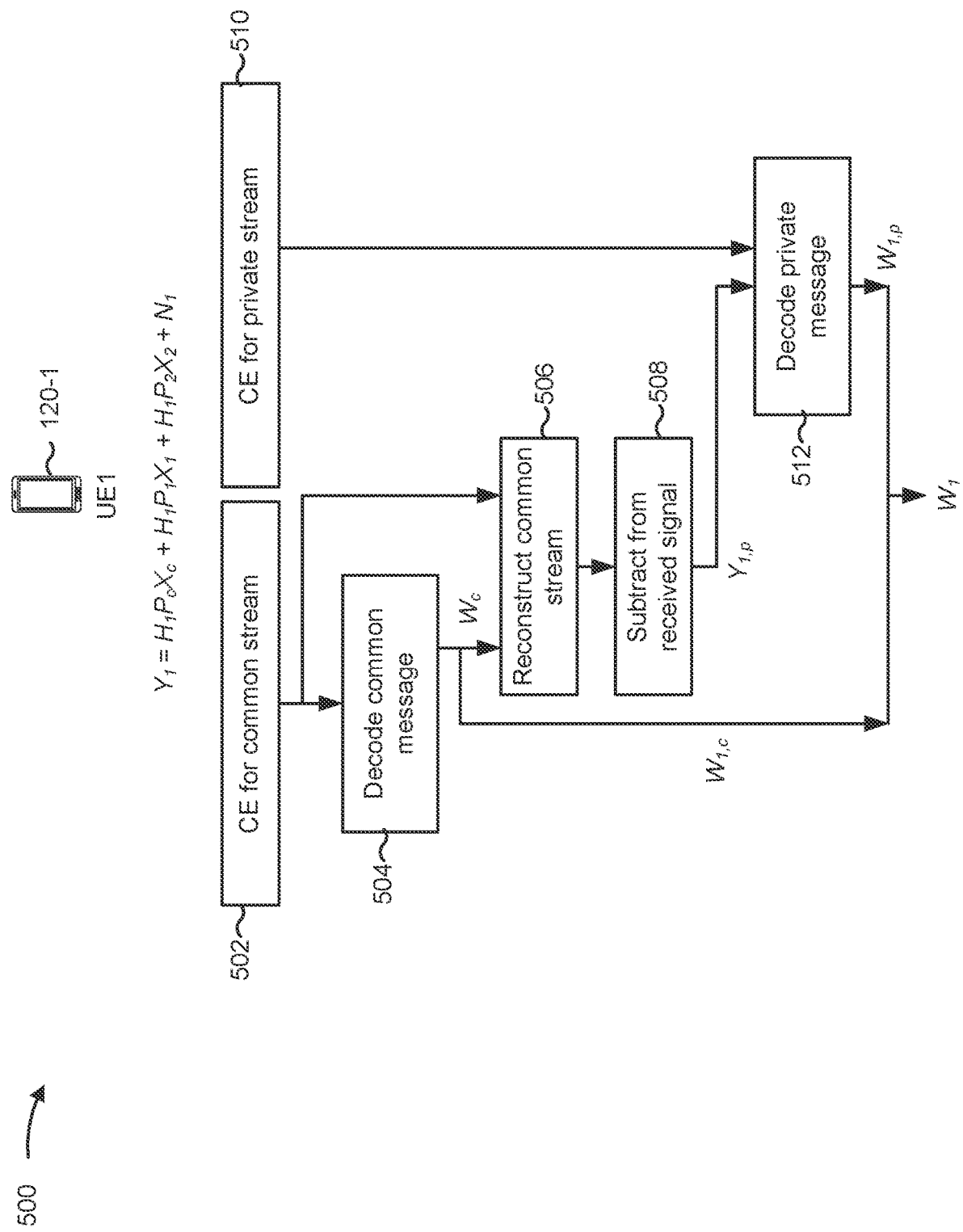
FIG. 5 is a diagram illustrating an example of a receiver decoding a rate splitting MIMO communication, in accordance with the present disclosure.

FIG. 5 is a diagram illustrating an example 500 of a receiver decoding a rate splitting MIMO communication, in accordance with the present disclosure. For simplicity, the example 500 shown in FIG. 5 illustrates steps that the UE1 120-1 may use to decode the received signal (e.g., $Y_1$) via the channel $H_1$, but other UEs (e.g., UE2 120-2) may perform a substantially similar process with respect to respective received signals (e.g., $Y_2$).

At the receiver side, each UE (e.g., UE1 120-1 and UE2 120-2 in the example depicted in FIG. 4) may first decode the common message. More particularly, as shown in connection with the channel estimation (CE) for common stream block indicated by reference number 502, the UE1 120-1 may perform channel estimation for the common stream (e.g., the UE1 120-1 may estimate $H_1P_c$), and, as shown in connection with the decode common message block indicated by reference number 504, the UE1 120-1 may decode the common message $W_c$ (e.g., the UE1 120 may perform a decoding process using the common stream $H_1P_cX_c$ based at least in part on the estimated channel, resulting in the common message $W_c$). In some cases, the operations performed at the block indicated by reference number 504 may include performing demodulation and/or demapping, in addition to decoding.

In some examples, decoding the common message $W_c$ may serve at least two purposes. First, a portion of the individual message intended for each receiver (e.g., $W_{1,c}$ and $W_{2,c}$) may be embedded in common message $W_c$. Thus, by decoding the common message $W_c$, the UE1 120-1 may retrieve data intended for the UE1 120-1. Put another way, by decoding the common message $W_c$, the UE1 120-1 may retrieve $W_{1,c}$. Second, decoding the common message $W_c$ may be used to perform SIC to increase the likelihood of successfully decoding the private message $W_{1,p}$. More particularly, after decoding the common message $W_c$, the UE1 120-1 may reconstruct the common stream $X_c$ (e.g., the UE1 120-1 may re-encode the common message $W_c$ to the common stream $X_c$), as shown in connection with the reconstruct common stream block indicated by reference number 506. Additionally, as shown in connection with the subtract from received signal block indicated by reference number 508, the UE1 120-1 may multiply the common stream $X_c$ by the estimated effective channel (e.g., $H_1P_c$) and subtract the result (e.g., $H_1P_cX_c$) from the received signal Y, resulting in a portion of the received signal $Y_{1,p}$ associated with the private part of the message intended for the UE1 120-1. In some examples, such as in examples associated with perfect channel estimation and successful decoding of the common message $W_c$, $Y_{1,p}$ may be equal to $Y_1-H_1P_cX_c$, or rather $H_1P_1X_1+H_1P_2X_2+N_1$.

The UE1 120-1 may then use the portion of the received signal $Y_{1,p}$ (e.g., $H_1P_1X_1+H_1P_2X_2+N_1$) to decode the private part $W_{1,p}$ of the message $W_1$ intended for the UE1 120-1. More particularly, as shown in connection with the CE for private stream block indicated by reference number 510, the UE1 120-1 may perform channel estimation for the private stream (e.g., the UE1 120-1 may estimate $H_1P_1$), and, as shown in connection with the decode private message block indicated by reference number 512, the UE1 120-1 may decode the private message $W_{1,p}$ (e.g., the UE1 120 may perform decoding on the portion of the received signal $Y_{1,p}$ based at least in part on the estimated channel, resulting in the private message $W_{1,p}$). In some cases, the operations performed at the block indicated by reference number 512 may including demodulation and/or demapping, in addition to decoding. The portion of the common message $W_{1,c}$ intended for the UE1 120-1 and the private message $W_{1,p}$ may thus jointly form the message $W_1$ intended for the UE1 120-1.

Although the operations described above in connection with FIG. 5 correspond to a UE performing SIC, in some other examples a receiver (e.g., UE 120) may perform different decoding schemes in order to decode the message intended for the respective receiver. For example, in some examples, an alternative to SIC may include a receiver performing joint demodulation of the private stream and the common stream, and then separately decoding the private codeword and the common codeword, among other decoding schemes. Moreover, although in the examples described above in connection with FIGS. 4 and 5 the common message $W_c$ included information intended for both the UE1 120-1 and the UE 120-2, in some other examples, the common message $W_c$ may include part of an individual message (e.g., $W_{k,c}$) for only a subset of co-scheduled UEs, which is described in more detail below in connection with FIG. 6.

As indicated above, FIG. 5 is provided as an example. Other examples may differ from what is described with respect to FIG. 5.

Figure 6:
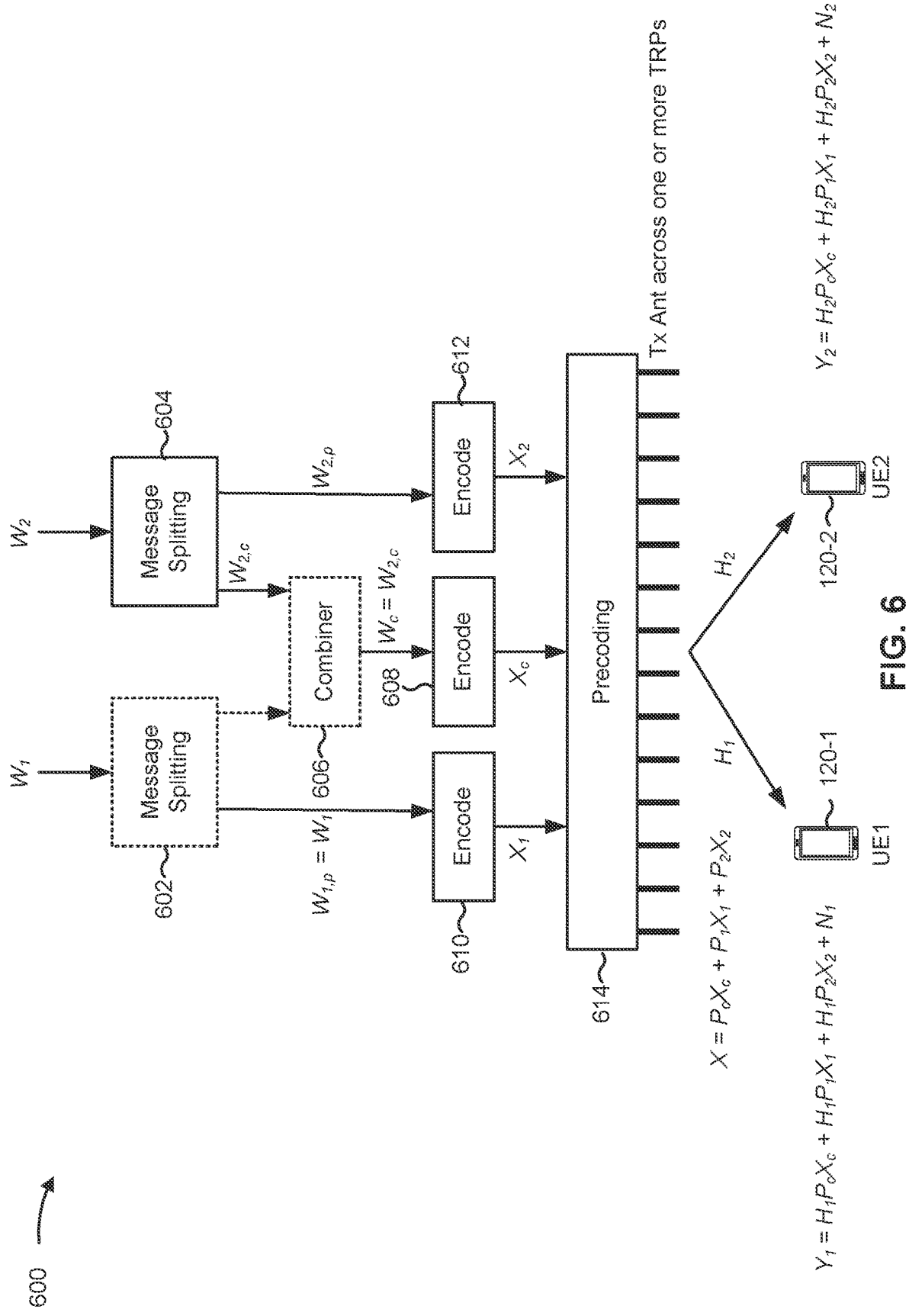
FIG. 6 is a diagram illustrating an example of a rate splitting MIMO communication, in accordance with the present disclosure.

FIG. 6 is a diagram illustrating an example 600 of a rate splitting MIMO communication, in accordance with the present disclosure.

In example 600, a first message $W_1$ is intended for UE1 120-1, and a second message $W_2$ is intended for UE2 120-2, similar to the communication scheme described above in connection with FIG. 4. In this example, however, the first message $W_1$ is not split into common and private parts. Instead, only the second message $W_2$ is split into common and private parts. More particularly, as shown by using a broken-line border in connection with the message splitting block indicated by reference numbers 602, the first message $W_1$ is not split into common and private parts, and thus the private part $W_{1,p}$ of the first message $W_1$ is the same as the first message $W_1$. In contrast, and in a similar manner as described above in connection with FIG. 4 and as shown in connection with the message splitting block indicated by reference number 604, the second message $W_2$ may be split into common and private parts. More particularly, the second message $W_2$ may be split into a common part $W_{2,c}$ and a private part $W_{2,p}$. In that regard, there may be no information intended for the first UE1 120-1 to be combined with the common part $W_{2,c}$ of the second message $W_2$. Thus, as shown using a broken-line border at the combiner block indicated by reference number 606, in this example no data is combined (e.g., concatenated). Instead, the common message $W_c$ may be equal to the common part $W_2c$ of the second message $W_2$.

As shown in connection with the encode block indicated by reference number 608, the common message $W_c$ (e.g., $W_{2,c}$) may be encoded and modulated to a common stream $X_c$, which may have one or more layers. As shown in connection with the encode blocks indicated by reference numbers 610 and 612, the private parts $W_{1,p}$ and $W_{2,p}$ of the individual messages $W_1$ and $W_2$ may be separately encoded and modulated into a first private stream $X_1$ and a second private stream $X_2$. In some cases, operations performed at the blocks indicated by reference numbers 608, 610, and 612 may include modulation and mapping to one or more layers (including CW-layer mapping) in addition to encoding.

As shown by reference number 614, the various streams (e.g., the common stream $X_c$, the first private stream $X_1$, and the second private stream $X_2$) may be precoded and transmitted by Tx antennas from one or more network nodes 110s and/or TRPs (e.g., from multiple network node 110 and/or TRPs in a CoMP transmission scenario), such that the transmit stream X transmitted by the Tx antennas may be equal to $P_cX_c+P_1X_1+P_2X_2$, as described above in connection with FIG. 4. The transmit stream X may be transmitted to each receiver (e.g., UE1 120-1 and UE2 120-2) over respective channels $H_1$ and $H_2$, resulting in received signal $Y_1$ (e.g., $H_1P_cX_c+H_1P_1X_1+H_1P_2X_2+N_1$) and $Y_2$ ($H_2P_cX_c+H_2P_1X_1+H_2P_2X_2+N_2$), as described above in connection with FIG. 4.

In this example, the UE2 120-2 may decode the common message $W_c$ in a similar manner as described in connection with the UE1 120-1 in FIG. 5, because the common message includes information intended for the UE2 120-2 (e.g., the common message $W_c$ includes $W_{2,c}$, and thus the UE2 120-2 may operate in a substantially similar manner as described above in connection with FIG. 5). In that regard, the UE2 120-2 may be provided, such as via DCI received from a network node, information associated with decoding the common stream, such as information associated with DMRS ports of the common stream (e.g., for channel estimation purposes), information associated with a modulation order associated with the common stream, hybrid automatic repeat request (HARQ) information associated with the common stream (e.g., transport block size (TBS), coding rate, new data indicator (NDI), redundancy version (RV)), or similar information.

However, in this example, the UE1 120-1 may not need to decode the common message $W_c$ because the common message $W_c$ does not include data intended for the UE1 120-1. Instead, the UE1 120-1 may only need to decode the common message $W_c$ if the UE1 120-1 is performing SIC, such as for purposes of increasing the probability that the UE1 120-1 will successfully decode the private message $W_{1,p}$. In cases in which the UE1 120-1 does not perform SIC, the UE1 120-1 may perform other interference management techniques without fully decoding the common message $W_c$, such as joint demodulation, soft interference cancellation, or similar techniques. In such cases, the UE1 120-1 may be indicated, such as via DCI received from a network node, with information associated with performing the other interference management techniques, such as information associated with the DMRS ports of the common stream (e.g., in order to perform channel estimation for the layers of the common stream), information associated with a modulation order of the common stream and/or a common codeword (e.g., in order to perform demodulation), or similar information. Because, in this example, the UE 120-1 is not decoding the common stream and/or performing SIC based at least in part on the common stream, the UE1 120-1 may not need to be provided with certain other information that was provided to the UE2 120-2, such as HARQ-related information associated with the common stream (e.g., TBS, coding rate, NDI, RV), or similar information.

Accordingly, information related to the common stream and needed by the UE1 120-1 may differ from information related to the common stream and needed by the UE2 120-2. Moreover, the information related to the common stream may be indicated via DCI (sometimes referred to as a scheduling DCI) used to schedule a PDSCH associated with transmission of the transmit stream X. In that regard, the scheduling DCI may indicate all parameters for the private codeword and/or private stream, as well as at least some parameters for the common codeword and/or common stream, but the level of information needed for the common codeword may depend on UE capabilities (e.g., whether the UE is capable of decoding a common message of a rate splitting MIMO communication, whether the UE is capable of performing SIC, a maximum configured modulation order, a maximum number of interfering layers, or similar capability information), as well as an RRC configuration associated with the common message (e.g., whether the common message includes information intended for the UE, whether the UE should perform SIC using the common message, or similar RRC configuration information). In that regard, a DCI format, a DCI size, one or more DCI fields, and/or one or more DCI field sizes for the DCI communications transmitted to the various UEs may vary depending on the UE capability and/or configuration. The use of varying DCI formats, DCI sizes, DCI fields, and/or DCI field sizes may result in a UE incorrectly monitoring certain DCI information and/or missing certain DCI information, resulting in communication errors and thus increased power, computing, and communication resource consumption to correct communication errors, as well as decreased throughput, increased latency, and overall inefficient usage of network resources.

Some techniques and apparatuses described herein enable a UE to identify at least one of a DCI format, a DCI size, one or more DCI fields, or one or more DCI field sizes associated with a DCI communication associated with a rate splitting MIMO communication, thereby resulting in decreased communication errors between the UE and a network node or a similar network entity. In some aspects, a UE may transmit capability information indicating a capability of the UE to support the rate splitting MIMO communication, and the UE may receive, based at least in part on the capability information, configuration information associated with the rate splitting MIMO communication. In such aspects, the UE may identify, based at least in part on the configuration information, at least one of the DCI format, the DCI size, the one or more DCI fields, or the one or more DCI field sizes associated with the DCI communication associated with the rate splitting MIMO communication. In this regard, the UE may effectively monitor the DCI communication and decode the rate splitting MIMO communication, resulting in decreased communication errors and thus decreased power, computing, and communication resource consumption that would otherwise be used to correct communication errors, as well as increased throughput, decreased latency, and overall more efficient usage of network resources.

As indicated above, FIG. 6 is provided as an example. Other examples may differ from what is described with respect to FIG. 6.

Figure 7:
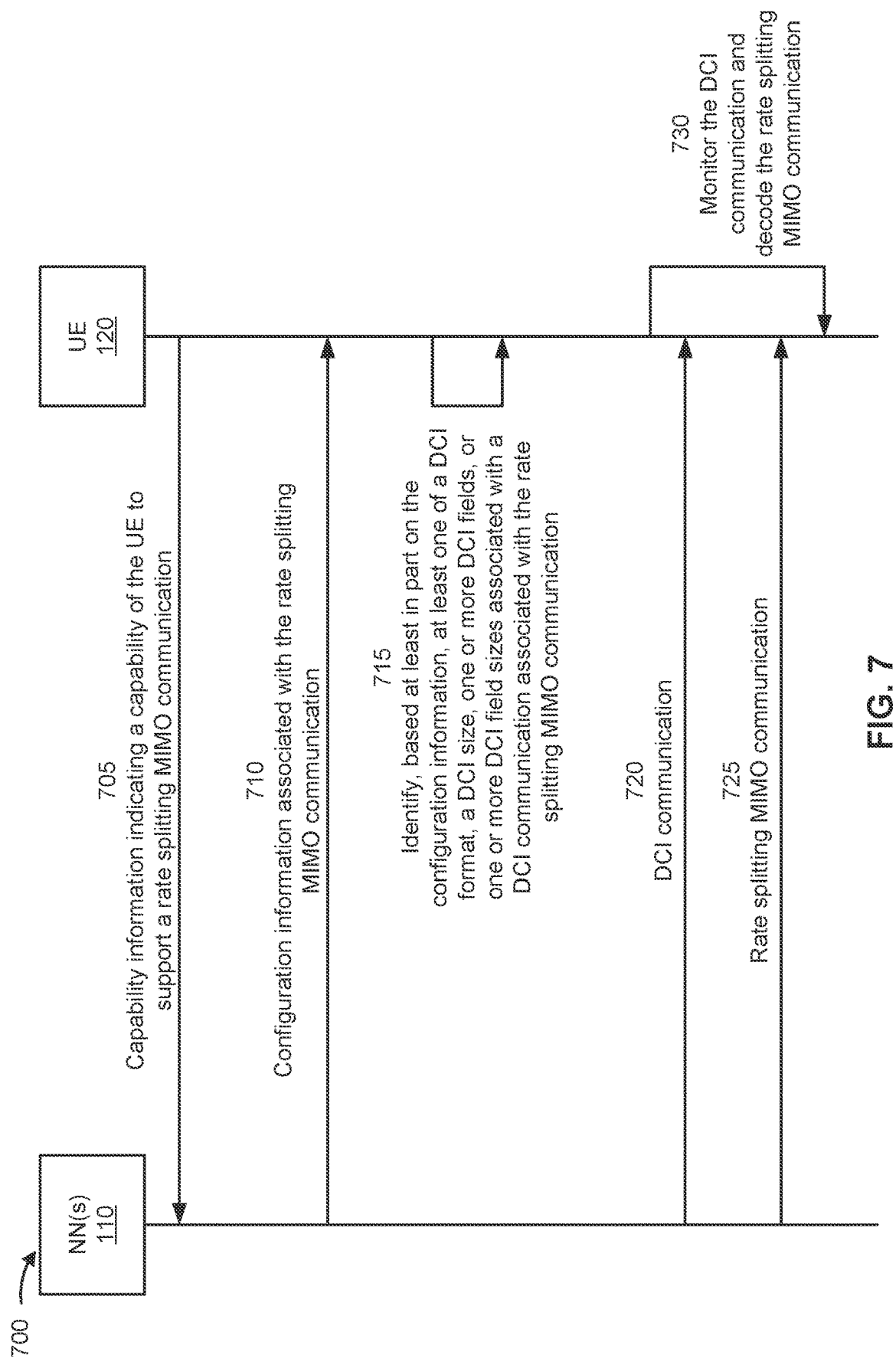
FIG. 7 is a diagram of an example associated with rate splitting for MIMO communications, in accordance with the present disclosure.

FIG. 7 is a diagram of an example 700 associated with rate splitting for multiple input multiple output communications, in accordance with the present disclosure. As shown in FIG. 7, a network node 110 (e.g., a CU, a DU, and/or an RU) may communicate with a UE 120 (e.g., UE1 120-1 or UE2 120-2). In some aspects, the network node 110 and the UE 120 may be part of a wireless network (e.g., wireless network 100). The UE 120 and the network node 110 may have established a wireless connection prior to operations shown in FIG. 7.

As shown by reference number 705, the UE 120 may transmit, and the network node 110 may receive, capability information (e.g., a capabilities report). In some aspects, the capabilities information may indicate a capability of the UE 120 to support a rate splitting MIMO communication, such as one of the rate splitting MIMO communications described above in connection with FIGS. 4-6. For example, in some aspects, the capability information may indicate a capability of the UE 120 to decode a common message (e.g., $W_c$) associated with the rate splitting MIMO communication. Additionally, or alternatively, the capability information indicates a capability of the UE 120 to perform SIC associated with a common message associated with the rate splitting MIMO communication, such as the SIC techniques described above in connection with FIG. 5. In some aspects, the capability information may indicate a capability of the UE 120 to re-encode after decoding the common message (e.g., $W_c$), as described above in connection with the block indicated by reference number 506 in FIG. 5. In that regard, in some aspects the UE 120 may be capable of decoding the common message (e.g., $W_c$) but may not be capable of performing SIC because the UE 120 does not have a capability to re-encode the common message after decoding, and thus the capability information may indicate that the UE 120 is capable of decoding the common message but that the UE 120 is not capable of performing SIC and/or that the UE 120 is not capable of re-encoding the common message after decoding.

Moreover, in aspects in which a UE 120 does not decode the common message (e.g., aspects in which no information intended for the UE 120 is included in the common message, aspects in which the UE 120 does not have a capability to decode the common message and/or perform SIC, aspects in which the UE 120 is not configured to decode the common message and/or perform SIC, which is described in more detail below in connection with configuration information shown by reference number 710, or similar aspects), the capability information may indicate a capability of the UE 120 to demodulate one or more layers associated with the common message associated with the rate splitting MIMO communication (e.g., a capability of the UE 120 to demodulate one or more layers of a common stream as interference layers). More particularly, in aspects in which the capability information indicates UE 120 support of demodulating one or more layers associated with the common message associated with the rate splitting MIMO communication, the capability information may indicate at least one of a maximum number of layers of a common message associated with the rate splitting MIMO communication (sometimes referred to as L) for which the UE 120 is capable of performing demodulation. Put another way, the capability information may indicate a maximum number of interfering layers (e.g., L) for which the UE 120 is capable of performing demodulation in addition to performing demodulation of the intended and/or private stream (e.g., $X_1$, $X_2$, or a similar private stream).

Additionally, or alternatively, in aspects in which the capability information indicates UE 120 support for demodulating one or more layers associated with the common message associated with the rate splitting MIMO communication, the capability information may indicate a maximum modulation order associated with the one or more layers of the common message (sometimes referred to as M) for which the UE 120 is capable of performing demodulation. Put another way, the capability information may indicate a maximum modulation order (e.g., M) of one or more layers (e.g., interfering layers) for which the UE 120 is capable of performing demodulation in addition to performing demodulation of the intended and/or private stream (e.g., $X_1$, $X_2$, or a similar private stream).

Additionally, or alternatively, in aspects in which the capability information indicates UE 120 support for demodulating one or more layers associated with the common message associated with the rate splitting MIMO communication, the capability information may indicate one or more pairs of a number of layers of the common message and a corresponding modulation order for the number of layers for which the UE 120 is capable of performing demodulation. Put another way, the capability information may include a list of pairs (L, M) indicating, for each pair, a maximum number of interfering layers for which the UE 120 may perform demodulation and a maximum modulation order assuming the maximum number of layers in the pair. In that regard, the UE 120 may be capable of supporting a different number of layers for different modulation orders. For example, the UE 120 may be capable of supporting 16 quadrature amplitude modulation (QAM) for two layers (corresponding to (L, M)=(2, 4)), and/or the UE 120 may be capable of supporting quadrature phase shift keying (QPSK) for four layers (corresponding to (L, M)=(4, 2)), but the UE 120 may not be capable of supporting 16 QAM for four layers (corresponding to (L, M)=(4, 4)). Accordingly, in such aspects, the capability information may indicate support for (L, M)=(2, 4) and (L, M)=(4, 2), but may not indicate support for (L, M)=(4, 4).

As shown by reference number 710, the network node 110 may transmit, and the UE 120 may receive, configuration information. In some aspects, the UE 120 may receive the configuration information via one or more of RRC signaling, one or more MAC control elements (MAC-CEs), and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples. In some aspects, the configuration information may be associated with a higher-layer configuration at the UE 120 transmitted via RRC signaling and/or one or more MAC-CEs.

In some aspects, the configuration information may be associated with a rate splitting MIMO communication (e.g., rate splitting MIMO communication shown in connection with reference number 725, described in more detail below). Additionally, or alternatively, the network node 110 may transmit, and the UE 120 may receive, the configuration information associated with the rate splitting MIMO communication based at least in part on the capability information described above in connection with reference number 705. For example, in aspects in which the capability information indicates that the UE 120 has a capability to decode a common message (e.g., $W_c$) associated with the rate splitting MIMO communication, the configuration information may include an indication that a common message (e.g., $W_c$) associated with the rate splitting MIMO communication may potentially include information intended for the UE 120. In such aspects, a DCI communication (e.g., DCI communication shown in connection with reference number 720, described in more detail below) may dynamically indicate whether the common message includes the information intended for the UE 120. Additionally, or alternatively, in some aspects, such as in aspects in which the capability information indicates that the UE 120 is capable of performing SIC, the configuration information may indicate a parameter enabling the UE 120 to perform SIC associated with a common message (e.g., $W_c$) associated with the rate splitting MIMO communication.

In aspects in which the capability information does not indicate UE 120 support for decoding a common message associated with the rate splitting MIMO communication and/or does not indicate UE 120 support for performing SIC, the configuration information may indicate one or more parameters enabling the UE 120 to demodulate one or more layers of a common message (e.g., $W_c$) associated with the rate splitting MIMO communication. For example, the configuration information may indicate a maximum number of layers (sometimes referred to as L') of the common message for which the UE 120 may be indicated to perform demodulation. In such aspects, an actual number of layers (e.g., L, which may be less than or equal to L') of the common message for which the UE 120 should perform demodulation may thereafter be indicated by a DCI communication (e.g., the DCI communication shown in connection with reference number 720). In some aspects, the maximum number of layers (e.g., L') of the common message for which the UE 120 may be indicated to perform demodulation may be equal to either one layer or three layers. Additionally, or alternatively, the configuration information may indicate a maximum modulation order (sometimes referred to as M') associated with one or more layers of the common message (e.g., interfering layers) for which the UE 120 may be indicated to perform demodulation. In such aspects, an actual modulation order (e.g., M, which may be less than or equal to M') associated with one or more layers of the common message for which the UE 120 should perform demodulation may thereafter be indicated by a DCI communication (e.g., the DCI communication shown in connection with reference number 720).

The UE 120 may configure itself based at least in part on the configuration information. In some aspects, the UE 120 may be configured to perform one or more operations described herein based at least in part on the configuration information.

As shown by reference number 715, in some aspects, the UE 120 may identify, based at least in part on the configuration information, at least one of a DCI format, a DCI size, one or more DCI fields, or one or more DCI field sizes associated with a DCI communication (e.g., the DCI communication shown in connection with reference number 720) associated with a rate splitting MIMO communication (e.g., the rate splitting MIMO communication shown in connection with reference number 725). In this way, and as is described in more detail below in connection with reference number 730, the UE 120 may monitor the DCI communication, decode the DCI communication, and/or decode a PDSCH communication (such as by processing the common stream, among other processing techniques) based at least in part on information included in the DCI communication.

For example, the UE 120 may identify that the DCI communication includes an indication of whether a common message is associated with the rate splitting MIMO communication (e.g., an indication of whether the common message (e.g., $W_c$), or interfering layers corresponding to the common stream, exist in the rate splitting MIMO communication). In some aspects, the DCI communication may include a one-bit DCI field indicating whether the common message exists in the rate splitting MIMO communication. Moreover, the presence of the DCI field indicating whether the common message exists in the rate splitting MIMO communication may be based at least in part on the configuration information described above in connection with reference number 710 including at least one of the indication that the common message may potentially include information intended for the UE 120, the parameter enabling the UE 120 to perform SIC associated with the common message, and/or the one or more parameters enabling the UE 120 to demodulate one or more layers of the common message.

Additionally, or alternatively, the UE 120 may identify that the DCI communication includes an indication of whether the common message associated with the rate splitting MIMO communication is intended for the UE 120. In some aspects, the DCI communication may include a one-bit DCI field indicating whether the common message associated with the rate splitting MIMO communication is intended for the UE 120. Moreover, the presence of the DCI field indicating whether the common message associated with the rate splitting MIMO communication is intended for the UE 120 may be based at least in part on the configuration information described above in connection with reference number 710 including the indication that the common message may potentially include information intended for the UE 120.

Additionally, or alternatively, the UE 120 may identify that the DCI communication includes an indication of whether the UE 120 should perform SIC associated with a common message associated with the rate splitting MIMO communication. In some aspects, the DCI communication may include a one-bit DCI field indicating whether the UE 120 should perform SIC associated with the common message associated with the rate splitting MIMO communication. Moreover, the presence of the DCI field indicating whether the UE 120 should perform SIC associated with the common message may be based at least in part on the configuration information described above in connection with reference number 710 including the parameter enabling the UE 120 to perform SIC associated with the common message.

Additionally, or alternatively, in some aspects, the UE 120 may identify that the DCI communication includes an indication of DMRS ports associated with a common message associated with the rate splitting MIMO communication, and/or a modulation order (e.g., M) associated with one or more layers (e.g., L) of the common message. In some aspects, the presence in the DCI communication of the indication of the DMRS ports associated with a common message, and/or the presence in the DCI communication of the modulation order (e.g., M) associated with one or more layers (e.g., L) of the common message, may be based at least in part on the configuration information indicating one or more parameters enabling the UE 120 to demodulate one or more layers of the common message. Additionally, or alternatively, the presence in the DCI communication of the indication of the at least one of the DMRS ports associated with a common message, and/or the presence in the DCI communication of the modulation order (e.g., M) associated with one or more layers (e.g., L) of the common message, may be based at least in part on the configuration information indicating that the common message may potentially include information intended for the UE 120, but then the DCI communication indicating that the common message does not include information intended for the UE 120; and/or the configuration information including the parameter enabling the UE 120 to perform SIC associated with the common message, but then the DCI communication indicating that the UE 120 should not perform SIC associated with a common message.

In aspects in which the DCI communication includes the indication of the DMRS ports associated with the common message, the indication may be associated with a DCI field having a size identified based at least in part on L' (e.g., the maximum number of layers of the common message for which the UE 120 may be indicated to perform demodulation). Moreover, in aspects in which the DCI communication includes the indication of the modulation order (e.g., M) associated with one or more layers (e.g., L) of the common message, the indication may be associated with a DCI field having a size identified based at least in part on M' (e.g., a maximum modulation order associated with one or more layers of the common message for which the UE 120 may be indicated to perform demodulation).

Additionally, or alternatively, in aspects in which the configuration information described above in connection with reference number 710 indicates the maximum number of layers (e.g., L') of the common message for which the UE 120 may be indicated to perform demodulation, the configuration information may further indicate a set of potential DMRS ports (sometimes referred to as N) associated with the rate splitting MIMO communication. In some aspects, the set of potential DMRS ports (e.g., N) may be greater than or equal to the maximum number of layers (e.g., L'). In such aspects, up to L' ports of the set of potential DMRS ports (e.g., N) may be indicated to the UE 120 for performing demodulation. Accordingly, in some aspects, the DCI communication may indicate a subset (sometimes referred to as l, where l is less than or equal to L') of the potential DMRS ports (e.g., N) that are associated with the common message associated with the rate splitting MIMO communication and for which the UE 120 should perform demodulation.

In some aspects, the indicated ports (e.g., the l ports) of the common stream and/or interference layers may not be included in an antenna ports field in the DCI communication that indicates DMRS ports associated with the private message (e.g., $W_{1,p}$). However, in some aspects, a number of code division multiplexing (CDM) groups without data (which may include CDM groups allocated to DMRS ports of other co-scheduled UEs), identified from the antenna ports field that indicate DMRS ports associated with the private message (e.g., $W_{1,p}$), may include the CDM ports of the indicated ports (e.g., the l ports) of the common stream and/or interfering layers. In some aspects, such as when all possibilities of DMRS ports may be indicated to the UE 120, the DCI field indicating the subset (e.g., l) of the potential DMRS ports (e.g., N) that are associated with the common message associated with the rate splitting MIMO communication and for which the UE 120 should perform demodulation may include $\lceil \log_2(\Sigma_{i=1}^{L'}(_i^N)) \rceil$ bits. In some other aspects, such as when only a subset of all possibilities of DMRS ports may be indicated to the UE 120, the DCI field indicating the subset (e.g., l) of the potential DMRS ports (e.g., N) that are associated with the common message associated with the rate splitting MIMO communication and for which the UE 120 should perform demodulation may include less than $\lceil \log_2(\Sigma_{i=1}^{L'}(_i^N)) \rceil$ bits. For example, in some aspects only one group of l ports out of N/l groups of ports may be indicated to the UE 120. In such aspects, the DCI field indicating the subset (e.g., l) of the potential DMRS ports (e.g., N) that are associated with the common message associated with the rate splitting MIMO communication and for which the UE 120 should perform demodulation may include $\lceil \log_2(\Sigma_{i=1}^{N} N/l) \rceil$ bits.

As shown by reference number 730, the UE 120 may monitor the DCI communication shown in connection with reference number 720 and decode the rate splitting MIMO communication shown in connection with reference number 725 based at least in part on the configuration information and the DCI communication. More particularly, based at least in part on the UE 120 identifying the at least one of the DCI format, the DCI size, the one or more DCI fields, or the one or more DCI field sizes associated with the DCI communication associated with a rate splitting MIMO communication (as described above in connection with reference number 715), the UE 120 may effectively monitor the DCI communication (shown in connection with reference number 720) and decode the rate splitting MIMO communication (shown in connection with reference number 725), resulting in decreased communication errors and thus decreased power, computing, and communication resource consumption that would otherwise be used to correct communication errors, as well as increased throughput, decreased latency, and overall more efficient usage of network resources.

As indicated above, FIG. 7 is provided as an example. Other examples may differ from what is described with respect to FIG. 7.

Figure 8:
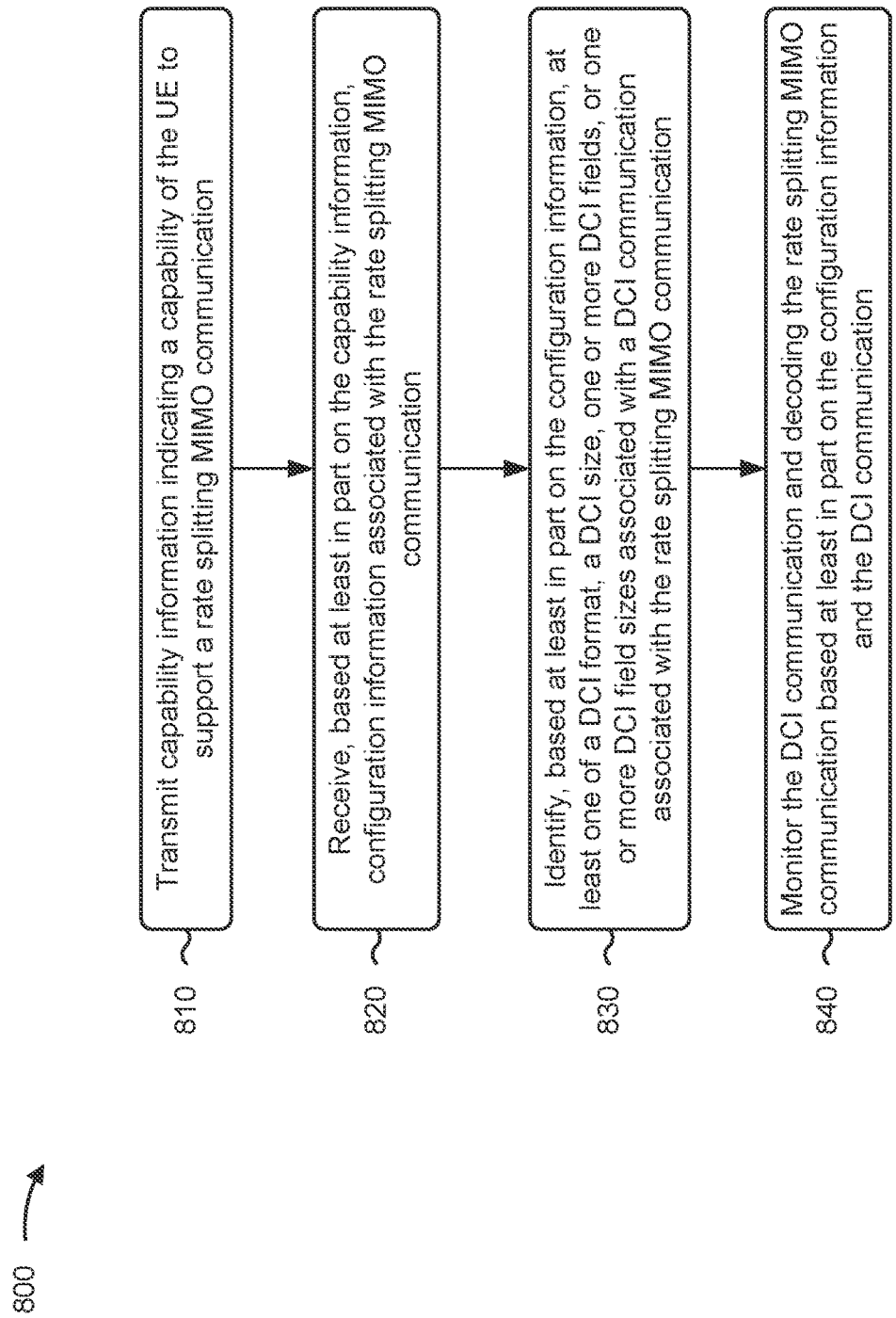
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with rate splitting for MIMO communications.

As shown in FIG. 8, in some aspects, process 800 may include transmitting capability information indicating a capability of the UE to support a rate splitting MIMO communication (block 810). For example, the UE (e.g., using communication manager 140 and/or transmission component 1004, depicted in FIG. 10) may transmit capability information indicating a capability of the UE to support a rate splitting MIMO communication, as described above.

As further shown in FIG. 8, in some aspects, process 800 may include receiving, based at least in part on the capability information, configuration information associated with the rate splitting MIMO communication (block 820). For example, the UE (e.g., using communication manager 140 and/or reception component 1002, depicted in FIG. 10) may receive, based at least in part on the capability information, configuration information associated with the rate splitting MIMO communication, as described above.

As further shown in FIG. 8, in some aspects, process 800 may include identifying, based at least in part on the configuration information, at least one of a DCI format, a DCI size, one or more DCI fields, or one or more DCI field sizes associated with a DCI communication associated with the rate splitting MIMO communication (block 830). For example, the UE (e.g., using communication manager 140 and/or identification component 1008, depicted in FIG. 10) may identify, based at least in part on the configuration information, at least one of a DCI format, a DCI size, one or more DCI fields, or one or more DCI field sizes associated with a DCI communication associated with the rate splitting MIMO communication, as described above.

As further shown in FIG. 8, in some aspects, process 800 may include monitoring the DCI communication and decoding the rate splitting MIMO communication based at least in part on the configuration information and the DCI communication (block 840). For example, the UE (e.g., using communication manager 140, monitoring component 1010, and/or decoding component 1012, depicted in FIG. 10) may monitor the DCI communication and decode the rate splitting MIMO communication based at least in part on the configuration information and the DCI communication, as described above.

Process 800 may include additional aspects, such as any single aspect or any combination of aspects described below and/or in connection with one or more other processes described elsewhere herein.

In a first aspect, the capability information indicates a capability of the UE to decode a common message associated with the rate splitting MIMO communication.

In a second aspect, alone or in combination with the first aspect, the capability information indicates a capability of the UE to perform successive interference cancelation associated with a common message associated with the rate splitting MIMO communication.

In a third aspect, alone or in combination with one or more of the first and second aspects, the capability information indicates a capability of the UE to demodulate one or more layers associated with a common message associated with the rate splitting MIMO communication.

In a fourth aspect, alone or in combination with one or more of the first through third aspects, the capability information further indicates at least one of a maximum number of layers of a common message associated with the rate splitting MIMO communication for which the UE is capable of performing demodulation, a maximum modulation order associated with the one or more layers of the common message for which the UE is capable of performing demodulation, or one or more pairs of a number of layers of the common message and a corresponding modulation order for the number of layers for which the UE is capable of performing demodulation.

In a fifth aspect, alone or in combination with one or more of the first through fourth aspects, the configuration information includes an indication that a common message associated with the rate splitting MIMO communication may potentially include information intended for the UE.

In a sixth aspect, alone or in combination with one or more of the first through fifth aspects, the DCI communication indicates whether the common message includes the information intended for the UE.

In a seventh aspect, alone or in combination with one or more of the first through sixth aspects, the configuration information indicates a parameter enabling the UE to perform successive interference cancelation associated with a common message associated with the rate splitting MIMO communication.

In an eighth aspect, alone or in combination with one or more of the first through seventh aspects, the configuration information indicates a parameter enabling the UE to demodulate one or more layers of a common message associated with the rate splitting MIMO communication.

In a ninth aspect, alone or in combination with one or more of the first through eighth aspects, the configuration information further indicates at least one of a maximum number of layers of the common message for which the UE may be indicated to perform demodulation, or a maximum modulation order associated with one or more layers of the common message for which the UE may be indicated to perform demodulation.

In a tenth aspect, alone or in combination with one or more of the first through ninth aspects, process 800 includes identifying that the DCI communication includes an indication of whether a common message is associated with the rate splitting MIMO communication.

In an eleventh aspect, alone or in combination with one or more of the first through tenth aspects, process 800 includes identifying that the DCI communication includes an indication of whether a common message associated with the rate splitting MIMO communication is intended for the UE.

In a twelfth aspect, alone or in combination with one or more of the first through eleventh aspects, process 800 includes identifying that the DCI communication includes an indication of whether the UE should perform successive interference cancelation associated with a common message associated with the rate splitting MIMO communication.

In a thirteenth aspect, alone or in combination with one or more of the first through twelfth aspects, process 800 includes identifying that the DCI communication includes an indication of at least one of reference signal ports associated with a common message associated with the rate splitting MIMO communication, or a modulation order associated with one or more layers of the common message.

In a fourteenth aspect, alone or in combination with one or more of the first through thirteenth aspects, the configuration information indicates a set of potential DMRS ports associated with the rate splitting MIMO communication, and the DCI communication indicates a subset of the potential DMRS ports that are associated with a common message associated with the rate splitting MIMO communication and for which the UE should perform demodulation.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
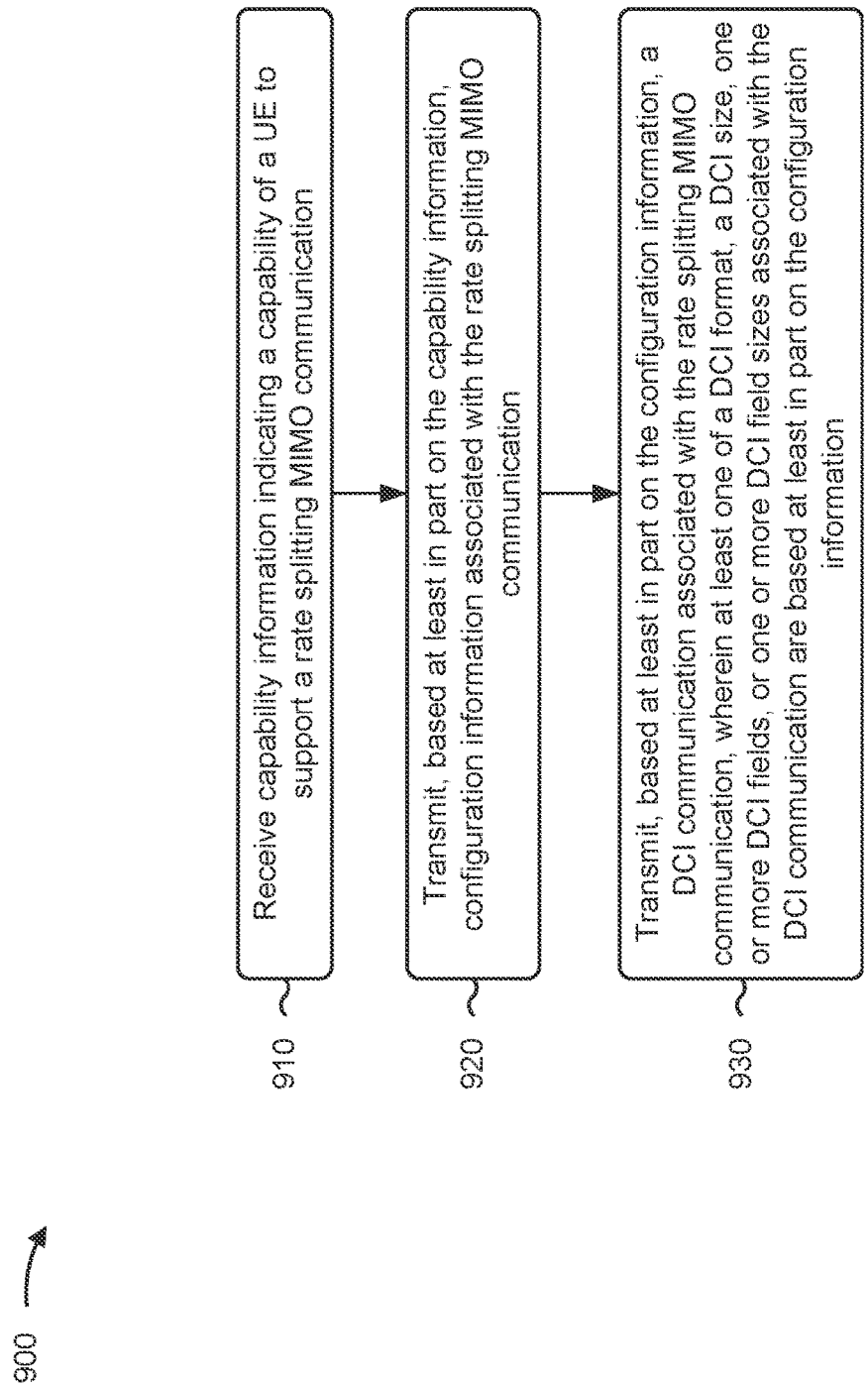
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with rate splitting for MIMO communications.

As shown in FIG. 9, in some aspects, process 900 may include receiving capability information indicating a capability of a UE to support a rate splitting MIMO communication (block 910). For example, the network node (e.g., using communication manager 150 and/or reception component 1102, depicted in FIG. 11) may receive capability information indicating a capability of a UE to support a rate splitting MIMO communication, as described above.

As further shown in FIG. 9, in some aspects, process 900 may include transmitting, based at least in part on the capability information, configuration information associated with the rate splitting MIMO communication (block 920). For example, the network node (e.g., using communication manager 150, transmission component 1104, and/or configuration component 1108, depicted in FIG. 11) may transmit, based at least in part on the capability information, configuration information associated with the rate splitting MIMO communication, as described above.

As further shown in FIG. 9, in some aspects, process 900 may include transmitting, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information (block 930). For example, the network node (e.g., using communication manager 150 and/or transmission component 1104, depicted in FIG. 11) may transmit, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information, as described above.

Process 900 may include additional aspects, such as any single aspect or any combination of aspects described below and/or in connection with one or more other processes described elsewhere herein.

In a first aspect, the capability information indicates a capability of the UE to decode a common message associated with the rate splitting MIMO communication.

In a second aspect, alone or in combination with the first aspect, the capability information indicates a capability of the UE to perform successive interference cancelation associated with a common message associated with the rate splitting MIMO communication.

In a third aspect, alone or in combination with one or more of the first and second aspects, the capability information indicates a capability of the UE to demodulate one or more layers associated with a common message associated with the rate splitting MIMO communication.

In a fourth aspect, alone or in combination with one or more of the first through third aspects, the capability information further indicates at least one of a maximum number of layers of a common message associated with the rate splitting MIMO communication for which the UE is capable of performing demodulation, a maximum modulation order associated with the one or more layers of the common message for which the UE is capable of performing demodulation, or one or more pairs of a number of layers of the common message and a corresponding modulation order for the number of layers for which the UE is capable of performing demodulation.

In a fifth aspect, alone or in combination with one or more of the first through fourth aspects, the configuration information includes an indication that a common message associated with the rate splitting MIMO communication may potentially include information intended for the UE.

In a sixth aspect, alone or in combination with one or more of the first through fifth aspects, the DCI communication indicates whether the common message includes the information intended for the UE.

In a seventh aspect, alone or in combination with one or more of the first through sixth aspects, the configuration information indicates a parameter enabling the UE to perform successive interference cancelation associated with a common message associated with the rate splitting MIMO communication.

In an eighth aspect, alone or in combination with one or more of the first through seventh aspects, the configuration information indicates a parameter enabling the UE to demodulate one or more layers of a common message associated with the rate splitting MIMO communication.

In a ninth aspect, alone or in combination with one or more of the first through eighth aspects, the configuration information further indicates at least one of a maximum number of layers of the common message for which the UE may be indicated to perform demodulation, or a maximum modulation order associated with one or more layers of the common message for which the UE may be indicated to perform demodulation.

In a tenth aspect, alone or in combination with one or more of the first through ninth aspects, the DCI communication indicates whether a common message is associated with the rate splitting MIMO communication.

In an eleventh aspect, alone or in combination with one or more of the first through tenth aspects, the DCI communication indicates whether a common message associated with the rate splitting MIMO communication is intended for the UE.

In a twelfth aspect, alone or in combination with one or more of the first through eleventh aspects, the DCI communication indicates whether the UE should perform successive interference cancelation associated with a common message associated with the rate splitting MIMO communication.

In a thirteenth aspect, alone or in combination with one or more of the first through twelfth aspects, the DCI communication indicates at least one of demodulation reference signal ports associated with a common message associated with the rate splitting MIMO communication, or a modulation order associated with one or more layers of the common message.

In a fourteenth aspect, alone or in combination with one or more of the first through thirteenth aspects, the configuration information indicates a set of potential DMRS ports associated with the rate splitting MIMO communication, and the DCI communication indicates a subset of the potential DMRS ports that are associated with a common message associated with the rate splitting MIMO communication and for which the UE should perform demodulation.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
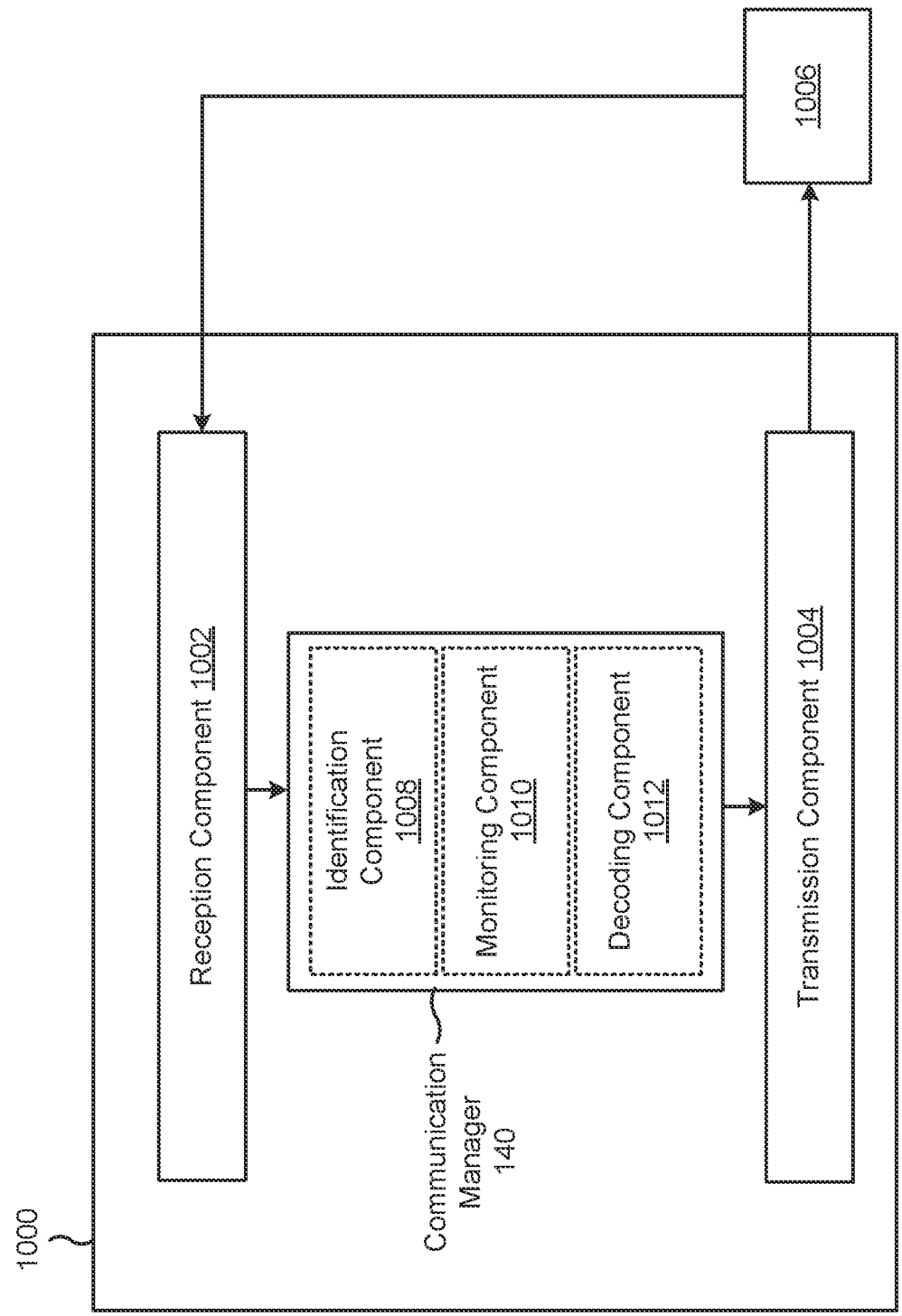
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE (e.g., UE 120), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 140. The communication manager 140 may include one or more of an identification component 1008, a monitoring component 1010, or a decoding component 1012, among other examples.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE 120 described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE 120 described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE 120 described in connection with FIG. 2. In some aspects, the transmission component 1004 may be co-located with the reception component 1002 in a transceiver.

The transmission component 1004 may transmit capability information indicating a capability of the UE to support a rate splitting MIMO communication. The reception component 1002 may receive, based at least in part on the capability information, configuration information associated with the rate splitting MIMO communication. The identification component 1008 may identify, based at least in part on the configuration information, at least one of a DCI format, a DCI size, one or more DCI fields, or one or more DCI field sizes associated with a DCI communication associated with the rate splitting MIMO communication. The monitoring component 1010 and/or the decoding component 1012 may monitor the DCI communication and decode the rate splitting MIMO communication based at least in part on the configuration information and the DCI communication.

The identification component 1008 may identify that the DCI communication includes an indication of whether a common message is associated with the rate splitting MIMO communication.

The identification component 1008 may identify that the DCI communication includes an indication of whether a common message associated with the rate splitting MIMO communication is intended for the UE.

The identification component 1008 may identify that the DCI communication includes an indication of whether the UE should perform successive interference cancelation associated with a common message associated with the rate splitting MTMO communication.

The identification component 1008 may identify that the DCI communication includes an indication of at least one of demodulation reference signal ports associated with a common message associated with the rate splitting MIMO communication, or a modulation order associated with one or more layers of the common message.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
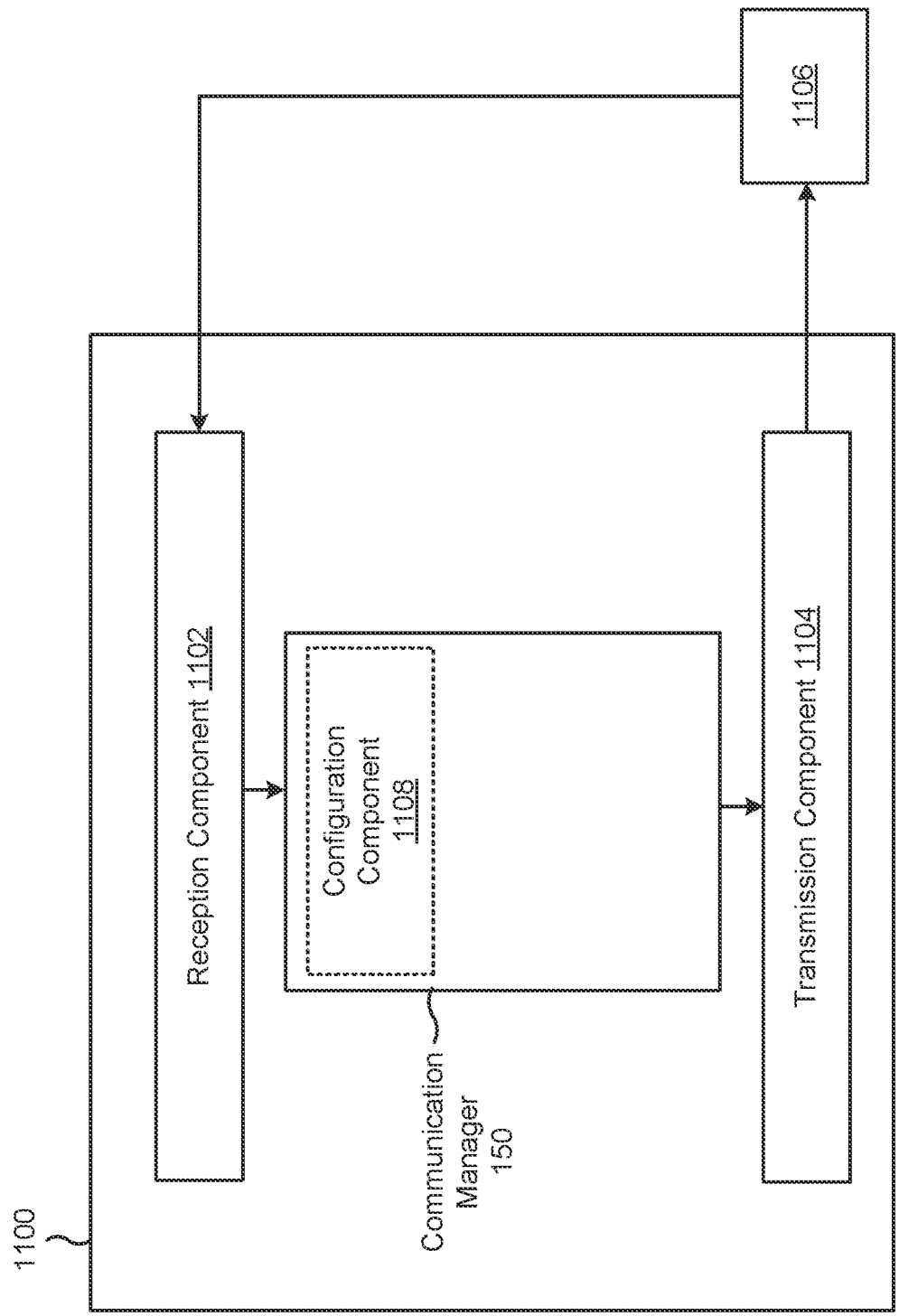
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a network node, or another wireless communication device) using the reception component 1102 and the transmission component 1104. As further shown, the apparatus 1100 may include the communication manager 150. The communication manager 150 may include a configuration component 1108, among other examples.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node 110 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node 110 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node 110 described in connection with FIG. 2. In some aspects, the transmission component 1104 may be co-located with the reception component 1102 in a transceiver.

The reception component 1102 may receive capability information indicating a capability of a UE to support a rate splitting MIMO communication. The transmission component 1104 and/or the configuration component 1108 may transmit, based at least in part on the capability information, configuration information associated with the rate splitting MIMO communication. The transmission component 1104 may transmit, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a UE, comprising: transmitting capability information indicating a capability of the UE to support a rate splitting MIMO communication; receiving, based at least in part on the capability information, configuration information associated with the rate splitting MIMO communication; identifying, based at least in part on the configuration information, at least one of a DCI format, a DCI size, one or more DCI fields, or one or more DCI field sizes associated with a DCI communication associated with the rate splitting MIMO communication; and monitoring the DCI communication and decoding the rate splitting MIMO communication based at least in part on the configuration information and the DCI communication.

Aspect 2: The method of Aspect 1, wherein the capability information indicates a capability of the UE to decode a common message associated with the rate splitting MIMO communication.

Aspect 3: The method of any of Aspects 1-2, wherein the capability information indicates a capability of the UE to perform successive interference cancelation associated with a common message associated with the rate splitting MIMO communication.

Aspect 4: The method of any of Aspects 1-3, wherein the capability information indicates a capability of the UE to demodulate one or more layers associated with a common message associated with the rate splitting MIMO communication.

Aspect 5: The method of Aspect 4, wherein the capability information further indicates at least one of: a maximum number of layers of a common message associated with the rate splitting MIMO communication for which the UE is capable of performing demodulation, a maximum modulation order associated with the one or more layers of the common message for which the UE is capable of performing demodulation, or one or more pairs of a number of layers of the common message and a corresponding modulation order for the number of layers for which the UE is capable of performing demodulation.

Aspect 6: The method of any of Aspects 1-5, wherein the configuration information includes an indication that a common message associated with the rate splitting MIMO communication may potentially include information intended for the UE.

Aspect 7: The method of Aspect 6, wherein the DCI communication indicates whether the common message includes the information intended for the UE.

Aspect 8: The method of any of Aspects 1-7, wherein the configuration information indicates a parameter enabling the UE to perform successive interference cancelation associated with a common message associated with the rate splitting MIMO communication.

Aspect 9: The method of any of Aspects 1-8, wherein the configuration information indicates a parameter enabling the UE to demodulate one or more layers of a common message associated with the rate splitting MIMO communication.

Aspect 10: The method of Aspect 9, wherein the configuration information further indicates at least one of: a maximum number of layers of the common message for which the UE may be indicated to perform demodulation, or a maximum modulation order associated with one or more layers of the common message for which the UE may be indicated to perform demodulation.

Aspect 11: The method of any of Aspects 1-10, further comprising identifying that the DCI communication includes an indication of whether a common message is associated with the rate splitting MIMO communication.

Aspect 12: The method of any of Aspects 1-11, further comprising identifying that the DCI communication includes an indication of whether a common message associated with the rate splitting MIMO communication is intended for the UE.

Aspect 13: The method of any of Aspects 1-12, further comprising identifying that the DCI communication includes an indication of whether the UE should perform successive interference cancelation associated with a common message associated with the rate splitting MIMO communication.

Aspect 14: The method of any of Aspects 1-13, further comprising identifying that the DCI communication includes an indication of at least one of: demodulation reference signal ports associated with a common message associated with the rate splitting MIMO communication, or a modulation order associated with one or more layers of the common message.

Aspect 15: The method of any of Aspects 1-14, wherein the configuration information indicates a set of potential DMRS ports associated with the rate splitting MIMO communication, and wherein the DCI communication indicates a subset of the potential DMRS ports that are associated with a common message associated with the rate splitting MIMO communication and for which the UE should perform demodulation.

Aspect 16: A method of wireless communication performed by a network node, comprising: receiving capability information indicating a capability of a UE to support a rate splitting MIMO communication; transmitting, based at least in part on the capability information, configuration information associated with the rate splitting MIMO communication; and transmitting, based at least in part on the configuration information, a DCI communication associated with the rate splitting MIMO communication, wherein at least one of a DCI format, a DCI size, one or more DCI fields, or one or more DCI field sizes associated with the DCI communication are based at least in part on the configuration information.

Aspect 17: The method of Aspect 16, wherein the capability information indicates a capability of the UE to decode a common message associated with the rate splitting MIMO communication.

Aspect 18: The method of any of Aspects 16-17, wherein the capability information indicates a capability of the UE to perform successive interference cancelation associated with a common message associated with the rate splitting MIMO communication.

Aspect 19: The method of any of Aspects 16-18, wherein the capability information indicates a capability of the UE to demodulate one or more layers associated with a common message associated with the rate splitting MIMO communication.

Aspect 20: The method of Aspect 19, wherein the capability information further indicates at least one of: a maximum number of layers of a common message associated with the rate splitting MIMO communication for which the UE is capable of performing demodulation, a maximum modulation order associated with the one or more layers of the common message for which the UE is capable of performing demodulation, or one or more pairs of a number of layers of the common message and a corresponding modulation order for the number of layers for which the UE is capable of performing demodulation.

Aspect 21: The method of any of Aspects 16-20, wherein the configuration information includes an indication that a common message associated with the rate splitting MIMO communication may potentially include information intended for the UE.

Aspect 22: The method of Aspect 21, wherein the DCI communication indicates whether the common message includes the information intended for the UE.

Aspect 23: The method of any of Aspects 16-22, wherein the configuration information indicates a parameter enabling the UE to perform successive interference cancelation associated with a common message associated with the rate splitting MIMO communication.

Aspect 24: The method of any of Aspects 16-23, wherein the configuration information indicates a parameter enabling the UE to demodulate one or more layers of a common message associated with the rate splitting MIMO communication.

Aspect 25: The method of Aspect 24, wherein the configuration information further indicates at least one of: a maximum number of layers of the common message for which the UE may be indicated to perform demodulation, or a maximum modulation order associated with one or more layers of the common message for which the UE may be indicated to perform demodulation.

Aspect 26: The method of any of Aspects 16-25, wherein the DCI communication indicates whether a common message is associated with the rate splitting MIMO communication.

Aspect 27: The method of any of Aspects 16-26, wherein the DCI communication indicates whether a common message associated with the rate splitting MIMO communication is intended for the UE.

Aspect 28: The method of any of Aspects 16-27, wherein the DCI communication indicates whether the UE should perform successive interference cancelation associated with a common message associated with the rate splitting MIMO communication.

Aspect 29: The method of any of Aspects 16-28, wherein the DCI communication indicates at least one of: demodulation reference signal ports associated with a common message associated with the rate splitting MIMO communication, or a modulation order associated with one or more layers of the common message.

Aspect 30: The method of any of Aspects 16-29, wherein the configuration information indicates a set of potential DMRS ports associated with the rate splitting MIMO communication, and wherein the DCI communication indicates a subset of the potential DMRS ports that are associated with a common message associated with the rate splitting MIMO communication and for which the UE should perform demodulation.

Aspect 31: An apparatus for wireless communication at a device, comprising a processor; memory coupled with the processor; and instructions stored in the memory and executable by the processor to cause the apparatus to perform the method of one or more of Aspects 1-15.

Aspect 32: A device for wireless communication, comprising a memory and one or more processors coupled to the memory, the one or more processors configured to perform the method of one or more of Aspects 1-15.

Aspect 33: An apparatus for wireless communication, comprising at least one means for performing the method of one or more of Aspects 1-15.

Aspect 34: A non-transitory computer-readable medium storing code for wireless communication, the code comprising instructions executable by a processor to perform the method of one or more of Aspects 1-15.

Aspect 35: A non-transitory computer-readable medium storing a set of instructions for wireless communication, the set of instructions comprising one or more instructions that, when executed by one or more processors of a device, cause the device to perform the method of one or more of Aspects 1-15.

Aspect 36: An apparatus for wireless communication at a device, comprising a processor; memory coupled with the processor; and instructions stored in the memory and executable by the processor to cause the apparatus to perform the method of one or more of Aspects 16-30.

Aspect 37: A device for wireless communication, comprising a memory and one or more processors coupled to the memory, the one or more processors configured to perform the method of one or more of Aspects 16-30.

Aspect 38: An apparatus for wireless communication, comprising at least one means for performing the method of one or more of Aspects 16-30.

Aspect 39: A non-transitory computer-readable medium storing code for wireless communication, the code comprising instructions executable by a processor to perform the method of one or more of Aspects 16-30.

Aspect 40: A non-transitory computer-readable medium storing a set of instructions for wireless communication, the set of instructions comprising one or more instructions that, when executed by one or more processors of a device, cause the device to perform the method of one or more of Aspects 16-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      transmit capability information indicating a capability of the UE to support a rate splitting multiple input multiple output (MIMO) communication;
      receive, based at least in part on the capability information, configuration information associated with the rate splitting MIMO communication;
      identify, based at least in part on the configuration information, at least one of a downlink control information (DCI) format, a DCI size, one or more DCI fields, or one or more DCI field sizes associated with a DCI communication associated with the rate splitting MIMO communication; and
      monitor the DCI communication and decoding the rate splitting MIMO communication based at least in part on the configuration information and the DCI communication.

2. The UE of claim 1, wherein the capability information indicates another capability of the UE to decode a common message associated with the rate splitting MIMO communication.

3. The UE of claim 1, wherein the capability information indicates another capability of the UE to perform successive interference cancelation associated with a common message associated with the rate splitting MIMO communication.

4. The UE of claim 1, wherein the capability information indicates another capability of the UE to demodulate one or more layers associated with a common message associated with the rate splitting MIMO communication.

5. The UE of claim 4, wherein the capability information further indicates at least one of:
   a maximum number of layers of the common message associated with the rate splitting MIMO communication for which the UE is capable of performing demodulation,
   a maximum modulation order associated with the one or more layers of the common message for which the UE is capable of performing demodulation, or
   one or more pairs of the maximum number of layers of the common message and a corresponding modulation order for the maximum number of layers for which the UE is capable of performing demodulation.

6. The UE of claim 1, wherein the configuration information includes an indication that a common message associated with the rate splitting MIMO communication may potentially include information intended for the UE.

7. The UE of claim 6, wherein the DCI communication indicates whether the common message includes the information intended for the UE.

8. The UE of claim 1, wherein the configuration information indicates a parameter enabling the UE to perform successive interference cancelation associated with a common message associated with the rate splitting MIMO communication.

9. The UE of claim 1, wherein the configuration information indicates a parameter enabling the UE to demodulate one or more layers of a common message associated with the rate splitting MIMO communication.

10. The UE of claim 9, wherein the configuration information further indicates at least one of:
    a maximum number of layers of the common message for which the UE may be indicated to perform demodulation, or
    a maximum modulation order associated with one or more layers of the common message for which the UE may be indicated to perform demodulation.

11. The UE of claim 1, wherein the one or more processors are further configured to identify that the DCI communication includes an indication of whether a common message is associated with the rate splitting MIMO communication.

12. The UE of claim 1, wherein the one or more processors are further configured to identify that the DCI communication includes an indication of whether a common message associated with the rate splitting MIMO communication is intended for the UE.

13. The UE of claim 1, wherein the one or more processors are further configured to identify that the DCI communication includes an indication of whether the UE should perform successive interference cancelation associated with a common message associated with the rate splitting MIMO communication.

14. The UE of claim 1, wherein the one or more processors are further configured to identify that the DCI communication includes an indication of at least one of:
    demodulation reference signal ports associated with a common message associated with the rate splitting MIMO communication, or
    a modulation order associated with one or more layers of the common message.

15. The UE of claim 1, wherein the configuration information indicates a set of potential demodulation reference signal (DMRS) ports associated with the rate splitting MIMO communication, and wherein the DCI communication indicates a subset of the set of potential DMRS ports that are associated with a common message associated with the rate splitting MIMO communication and for which the UE should perform demodulation.

16. A network node for wireless communication, comprising:
    a memory; and
    one or more processors, coupled to the memory, configured to:
       receive capability information indicating a capability of a user equipment (UE) to support a rate splitting multiple input multiple output (MIMO) communication;
       transmit, based at least in part on the capability information, configuration information associated with the rate splitting MIMO communication; and
       transmit, based at least in part on the configuration information, a downlink control information (DCI) communication associated with the rate splitting MIMO communication, wherein at least one of a DCI format, a DCI size, one or more DCI fields, or one or more DCI field sizes associated with the DCI communication are based at least in part on the configuration information.

17. The network node of claim 16, wherein the capability information indicates another capability of the UE to decode a common message associated with the rate splitting MIMO communication.

18. The network node of claim 16, wherein the capability information indicates another capability of the UE to perform successive interference cancelation associated with a common message associated with the rate splitting MIMO communication.

19. The network node of claim 16, wherein the capability information indicates another capability of the UE to demodulate one or more layers associated with a common message associated with the rate splitting MIMO communication.

20. The network node of claim 19, wherein the capability information further indicates at least one of:
- a maximum number of layers of the common message associated with the rate splitting MIMO communication for which the UE is capable of performing demodulation,
- a maximum modulation order associated with the one or more layers of the common message for which the UE is capable of performing demodulation, or
- one or more pairs of the maximum number of layers of the common message and a corresponding modulation order for the maximum number of layers for which the UE is capable of performing demodulation.

21. The network node of claim 16, wherein the configuration information includes an indication that a common message associated with the rate splitting MIMO communication may potentially include information intended for the UE.

22. The network node of claim 16, wherein the configuration information indicates a parameter enabling the UE to perform successive interference cancelation associated with a common message associated with the rate splitting MIMO communication.

23. The network node of claim 16, wherein the configuration information indicates a parameter enabling the UE to demodulate one or more layers of a common message associated with the rate splitting MIMO communication.

24. The network node of claim 16, wherein the DCI communication indicates whether a common message is associated with the rate splitting MIMO communication.

25. The network node of claim 16, the DCI communication indicates whether a common message associated with the rate splitting MIMO communication is intended for the UE.

26. The network node of claim 16, wherein the DCI communication indicates whether the UE should perform successive interference cancelation associated with a common message associated with the rate splitting MIMO communication.

27. A method of wireless communication performed by a user equipment (UE), comprising:
- transmitting capability information indicating a capability of the UE to support a rate splitting multiple input multiple output (MIMO) communication;
- receiving, based at least in part on the capability information, configuration information associated with the rate splitting MIMO communication;
- identifying, based at least in part on the configuration information, at least one of a downlink control information (DCI) format, a DCI size, one or more DCI fields, or one or more DCI field sizes associated with a DCI communication associated with the rate splitting MTMO communication; and
- monitoring the DCI communication and decoding the rate splitting MIMO communication based at least in part on the configuration information and the DCI communication.

28. The method of claim 27, further comprising identifying that the DCI communication includes an indication of whether a common message is associated with the rate splitting MIMO communication.

29. A method of wireless communication performed by a network node, comprising:
- receiving capability information indicating a capability of a user equipment (UE) to support a rate splitting multiple input multiple output (MIMO) communication;
- transmitting, based at least in part on the capability information, configuration information associated with the rate splitting MIMO communication; and
- transmitting, based at least in part on the configuration information, a downlink control information (DCI) communication associated with the rate splitting MIMO communication, wherein at least one of a DCI format, a DCI size, one or more DCI fields, or one or more DCI field sizes associated with the DCI communication are based at least in part on the configuration information.

30. The method of claim 29, wherein the configuration information includes an indication that a common message associated with the rate splitting MIMO communication may potentially include information intended for the UE.

* * * * *